US008995925B2

(12) United States Patent
Ekici

(10) Patent No.: US 8,995,925 B2
(45) Date of Patent: *Mar. 31, 2015

(54) PERFORMING INTER-FREQUENCY MEASUREMENTS IN A MOBILE NETWORK

(71) Applicant: BlackBerry Limited, Waterloo (CA)

(72) Inventor: Ozgur Ekici, Escondido, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,312

(22) Filed: Apr. 25, 2014

(65) Prior Publication Data

US 2014/0235176 A1    Aug. 21, 2014

Related U.S. Application Data

(63) Continuation of application No. 13/282,092, filed on Oct. 26, 2011, now Pat. No. 8,731,477.

(51) Int. Cl.
*H04B 17/00* (2006.01)
*H04W 24/10* (2009.01)

(52) U.S. Cl.
CPC .................................... *H04W 24/10* (2013.01)
USPC .................. 455/67.11; 455/435.2; 455/166.2; 370/252

(58) Field of Classification Search
USPC .......... 455/67.11, 435.2, 166.2, 115.3, 226.2, 455/226.1, 115.1; 370/252, 333, 332
See application file for complete search history.

(56) References Cited

U.S. PATENT DOCUMENTS

| 6,591,108 | B1 * | 7/2003 | Herrig ........................ 455/452.1 |
| 7,017,172 | B2 * | 3/2006 | Schaffer et al. ................ 725/46 |
| 7,593,367 | B2 * | 9/2009 | Amerga et al. ............... 370/332 |
| 8,019,352 | B2 * | 9/2011 | Rappaport et al. ......... 455/456.1 |
| 8,614,981 | B2 * | 12/2013 | Mallik et al. .................. 370/329 |
| 8,731,477 | B2 * | 5/2014 | Ekici .......................... 455/67.11 |
| 2003/0231605 | A1 * | 12/2003 | Amerga et al. ............... 370/332 |
| 2004/0023634 | A1 | 2/2004 | Jeong et al. |
| 2006/0019679 | A1 * | 1/2006 | Rappaport et al. ......... 455/456.5 |

(Continued)

FOREIGN PATENT DOCUMENTS

| WO | 9859448 | 12/1998 |
| WO | 2008054072 | 5/2008 |
| WO | 2011021592 | 2/2011 |

OTHER PUBLICATIONS

European Patent Office, "European Search Report", issued in connection with European Patent Application No. 12189051.1, dated Oct. 7, 2014 (9 pages).

(Continued)

*Primary Examiner* — Minh D Dao
(74) *Attorney, Agent, or Firm* — Hanley, Flight & Zimmerman, LLC

(57) ABSTRACT

Methods, apparatus and articles of manufacture for performing inter-frequency measurements in a mobile network are disclosed. Example methods disclosed herein include a mobile station receiving, from a network, one or more lists specifying a set of frequencies for which measurements are to be performed. Such example methods also include the mobile station varying a rate at which the measurements are to be performed for a first frequency of the set of frequencies based on a number of frequencies for which the measurements are to be performed.

21 Claims, 15 Drawing Sheets

(56) References Cited

U.S. PATENT DOCUMENTS

| | | | | |
|---|---|---|---|---|
| 2006/0134660 | A1* | 6/2006 | Quinlan et al. | 435/6 |
| 2007/0055570 | A1* | 3/2007 | Martin | 705/14 |
| 2008/0102845 | A1* | 5/2008 | Zhao | 455/450 |
| 2009/0047958 | A1 | 2/2009 | Rimhagen et al. | |
| 2009/0239515 | A1* | 9/2009 | Bai et al. | 455/416 |
| 2010/0265918 | A1 | 10/2010 | Marinier et al. | |
| 2012/0009959 | A1* | 1/2012 | Yamada et al. | 455/507 |
| 2013/0077514 | A1* | 3/2013 | Dinan | 370/252 |
| 2013/0188510 | A1* | 7/2013 | Siomina et al. | 370/252 |

OTHER PUBLICATIONS

Patent Cooperation Treaty, "International Search Report and The Written Opinion of the International Searching Authority," issued in connection with International application No. PCT/CA2012/050749, dated Jan. 14, 2013, 8 pages.

"3rd Generation Partnership Project; Technical Specification Group Radio Access Network; Requirements for Support of Radio Resource Management (TDD) (Release 10)," 3GPP TS 25.123, Version 10.1.0, Apr. 2011 (449 pages).

"3rd Generation Partnership Project; Technical Specification Group Radio Access Network; Requirements for Support of Radio Resource Management (FDD) (Release 10)," 3GPP TS 25.133, Version 10.1.0, Apr. 2011 (254 pages).

"3rd Generation Partnership Project; Technical Specification Group Radio Access Network; Radio Resource Control (RRC); Protocol Specification (Release 10)," 3GPP TS 25.331, Version 10.3.1, Apr. 2011 (1863 pages).

"3rd Generation Partnership Project; Technical Specification Group GSM/EDGE Radio Access Network; Functions Related to Mobile Station (MS) in Idle Mode and Group Receive Mode (Release 10)," 3GPP TS 43.022, Version 10.0.0, Mar. 2011 (24 pages).

"3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018, Version 10.2.0, Mar. 2011 (431 pages).

"3rd Generation Partnership Project; Technical Specification Group GSM/EDGE Radio Access Network; Radio Subsystem Link Control (Release 10)," 3GPP TS 45.008, Version 10.0.0, Mar. 2011 (148 pages).

TSG-RAN Working Group 2, "Number of UTRAN frequencies monitored by an MS," R2-020210, TSG-GERAN, Orlando, FL Feb. 18-22, 2002 (2 pages).

TSG-RAN Working Group 2, "Response to LS on number of UTRAN frequencies monitored by an MS," R2-020226, TSG-RAN WG4, Orlando, FL Feb. 18-22, 2002 (1 page).

QUALCOMM, "Change Request: Number of UTRAN and Inter-RAT Frequencies" R2-020516, 3GPP TSG-RAN2 Meeting #27, Orlando, FL Feb. 18-22, 2002 (9 pages).

Patent Cooperation Treaty, "International Preliminary Report on Patentability," issued in connection with International application No. PCT/CA2012/050749, dated Apr. 29, 2014, (6 pages).

United States Patent and Trademark Office, "Non-Final Office Action", issued in connection with U.S. Appl. No. 13/282,092, dated Sep. 27, 2013 (8 pages).

United States Patent and Trademark Office, "Notice of Allowance", issued in connection with U.S. Appl. No. 13/282,092, dated Jan. 6, 2014 (6 pages).

Canadian Intellectual Property Office, "Office Action", issued in connection with Canadian Patent Application No. 2,793,193, dated Jul. 22, 2014 (2 pages).

* cited by examiner

PERFORMING INTER-FREQUENCY MEASUREMENTS IN A MOBILE NETWORK

RELATED APPLICATION(S)

This patent arises from a continuation of U.S. patent application Ser. No. 13/282,092 (now U.S. Pat. No. 8,731,477), entitled "PERFORMING INTER-FREQUENCY MEASUREMENTS IN A MOBILE NETWORK" and filed on Oct. 26, 2011. U.S. patent application Ser. No. 13/282,092 is hereby incorporated by reference in its entirety.

FIELD OF THE DISCLOSURE

This disclosure relates generally to mobile networks and, more particularly, to performing inter-frequency measurements in a mobile network.

BACKGROUND

In many mobile networks, the mobile network sends neighbor cell information to mobile stations operating in the network to indicate neighbor cells for which measurements are to be performed. The neighbor cell information may list cells having different carrier frequencies. Additionally, in a mobile network supporting multiple radio access technologies (RATs), such as universal terrestrial radio access network (UTRAN) functionality and GPRS EDGE radio access network (GERAN) functionality, the neighbor cell information may list cells corresponding to different RATs, as well as different carrier frequencies. (GPRS refers to the general packet radio service, EDGE refers to enhanced data rates for GSM evolution, and GSM refers to the global system for mobile communication.) As such, the neighbor cell information sent by such mobile networks may indicate that the mobile station is expected to perform inter-frequency measurements across one or more RATs.

DETAILED DESCRIPTION

Figure 1:
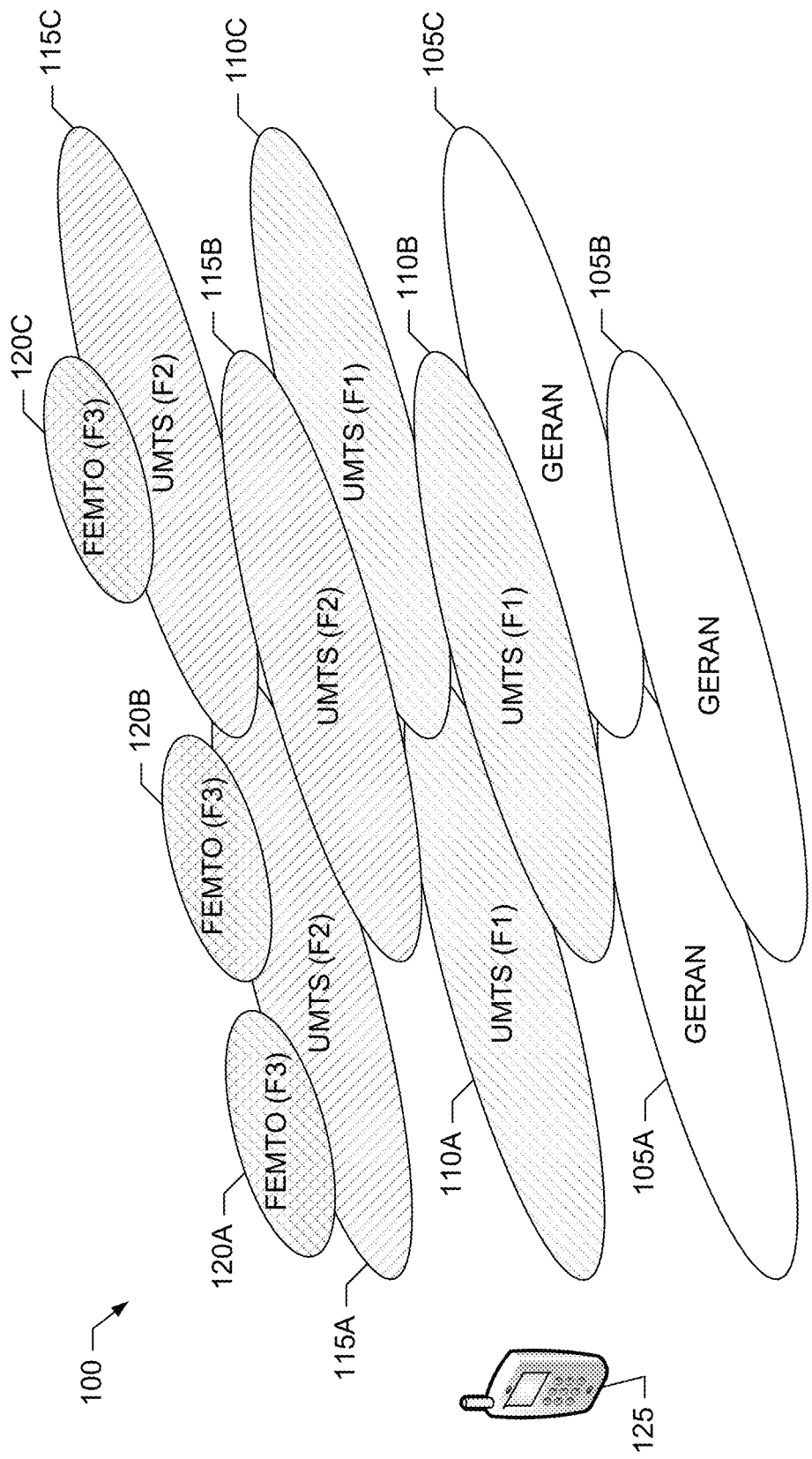
FIG. 1 is block diagram of an example mobile network in which inter-frequency measurements can be performed as disclosed herein.

Methods, apparatus and articles of manufacture for performing inter-frequency measurements (e.g., across one or more RATs) in a mobile network are disclosed herein. In an example method disclosed herein, an example mobile station obtains, from an example network, a list specifying a set of frequencies for which measurements are to be performed. For example, the list may correspond to a neighbor cell list specifying third generation (3G) cells, such as UTRAN cells, and/or second generation (2G) cells, such as GERAN cells. In the example method, if the set of frequencies specified in the list exceeds a monitoring capability of the mobile station, the mobile station prioritizes measurement of a subset of frequencies from the set of frequencies based on information separate from the list obtained from the network.

For example, the information separate from the list obtained from the network can include a list of prior frequencies used by the mobile station. For example, the list of prior frequencies can be maintained by the mobile station and contain frequencies of a set of cells with which the mobile station has been in a connected state or on which the mobile station has been camped. However, in some examples, the list of prior frequencies may exclude each cell on which the mobile station has been camped in a limited service state. In such an example, the mobile station can prioritize measurement of the subset of frequencies by determining the subset of frequencies to be those frequencies included in both the list obtained from the network and the list of prior frequencies used by the mobile station. In some examples, if measurement of the determined subset of frequencies does not yet exceed the monitoring capability of the mobile station, the mobile station can perform measurements for this subset of frequencies and another subset of frequencies in which each frequency in this second subset of frequencies is selected from the set of frequencies based on, for example, a number of cells associated with the frequency, a received signal strength indication associated with the frequency, etc.

In another example, the information separate from the list obtained from the network can include received signal strength indication measurements obtained for each frequency in the set of frequencies. In such an example, the mobile station can prioritize measurement of the subset of frequencies by determining the subset of frequencies to include a number of frequencies having the highest received signal strength indication measurements.

In yet another example, the information separate from the list obtained from the network can include a respective reselection priority obtained for each frequency in the set of frequencies. In such an example, the mobile station can prioritize measurement of the subset of frequencies by determining the subset of frequencies based on the reselection priorities.

In a further example, the mobile station can prioritize measurement of the subset of frequencies by determining the subset of frequencies to include a first subset of frequencies appearing at the beginning of the list obtained from the network and a second subset of frequencies determined based on the information separate from the list obtained from the network. Other examples and combinations of examples for performing inter-frequency measurements in a mobile network are described in greater detail below.

As mentioned above, mobile networks can send neighbor cell information to mobile stations operating in the network that indicates the mobile stations are expected to perform inter-frequency measurements across one or more RATs. For example, the inter-frequency measurements that the mobile station is expected to perform may include measurements on one or more other frequencies of the same RAT in which the mobile station is currently operating. Additionally or alternatively, the inter-frequency measurements that the mobile station is expected to perform may include measurements on one or more frequencies of one or more other RATs different from the RAT in which the mobile station is currently operating. Thus, as used herein, the term inter-frequency measurements can refer to measurements to be performed on one or more other frequencies of the same RAT in which the mobile station is currently operating, and can also refer to measurements to be performed on one or more frequencies of one or more other RATs different from the RAT in which the mobile station is currently operating.

In some scenarios, the number of frequencies (across one or more RATs) specified in a signaled neighbor cell list can exceed the monitoring capabilities of a particular mobile station. Mobile station behavior in prior mobile networks that are compliant with the Third Generation Partnership Project (3GPP) specifications, such as prior networks supporting UTRAN and/or GERAN functionality, is not specified for cases in which the number of frequencies (across one or more RATs) specified in the signaled neighbor cell list exceeds the mobile station's monitoring capabilities. Therefore, in such cases, these prior mobile networks may not know for which frequencies a mobile station will perform and report measurements. Unlike such prior networks, in the example mobile networks disclosed herein, mobile station behavior is specified for situations in which the number of frequencies (across one or more RATs) specified in the signaled neighbor cell list exceeds the mobile station's monitoring capabilities. Furthermore, example approaches for prioritizing inter-frequency measurements when the number of neighbor cell frequencies (across one or more RATs) exceeds the mobile station's monitoring capabilities are disclosed.

Turning to the figures, FIG. 1 illustrates a block diagram of an example mobile network 100 in which inter-frequency measurements can be performed as disclosed herein. The mobile network 100 illustrated in FIG. 1 includes GERAN (or, more generally, 2G) cells 105A-C and UTRAN (or, more generally, 3G) cells 110A-C and 115A-C. The UTRAN cells 110A-C and 115A-C in the illustrated example correspond to UTRAN macro-cells deployed on two different UTRAN carrier frequencies, denoted as F1 and F2 in FIG. 1. In the illustrated example, the mobile network 100 also includes UTRAN (or, more generally, 3G) femto cells 120A-C, which are deployed to operate on a further UTRAN carrier frequency, denoted as F3 in FIG. 1. In some examples, the mobile network 100 can include one or more Evolved-UTRAN (E-UTRAN) cells (not shown) deployed on one or more E-UTRAN carrier frequencies and/or one or more cells (not shown) of one or more other RATs deployed on one or more carrier frequencies of those other RAT(s).

The mobile network 100 illustrated in the example of FIG. 1 also includes an example mobile station 125, also referred to herein as user equipment (UE) 125. In the illustrated example, the mobile station 125 is multi-RAT capable and can communicate with and/or perform measurements of the GERAN cells 105A-C, the UTRAN cells 110A-C and 115A-C, and the femto cells 120A-C. Furthermore, and as described in greater detail below, the mobile station 125 can implement one or more of the example techniques for performing inter-frequency measurements disclosed herein. Additionally, in some examples, one or more network elements implementing the GERAN cells 105A-C, the UTRAN cells 110A-C and/or 115A-C, and/or the femto cells 120A-C can support one or more of the example techniques for performing inter-frequency measurements disclosed herein. Although the mobile station 125 is depicted in FIG. 1 as being multi-RAT capable, in some examples the mobile station 125 could support just a single RAT, such as UTRAN, and implement one or more of the example disclosed inter-frequency measurement techniques to perform inter-frequency measurements on multiple frequencies in the single RAT supported by the mobile station 125. Also, although the example mobile network 100 includes three GERAN cells 105A-C, six UTRAN cells 110A-C and 115A-C, three femto cells 120A-C, and one mobile station 125, the example inter-frequency measurement techniques disclosed herein can be used in a mobile network including any number of GERAN cells 105A-C, UTRAN cells 110A-C and/or 115A-C, and/or femto cells 120A-C. Moreover, the example inter-frequency measurement techniques disclosed herein are not limited to mobile networks employing GERAN, UTRAN and femto cells as illustrated in the example of FIG. 1, but may be used in any mobile network in which mobile stations may be directed to perform measurements on multiple frequencies such that the measurement or monitoring capabilities of a mobile station may be exceeded. For example, the inter-frequency measurement techniques disclosed herein can be used in a Long Term Evolution (LTE) network supporting E-UTRAN cells in addition or as an alternative to the GERAN, UTRAN and/or femto cells illustrated in FIG. 1.

Inter-frequency measurements are performed by a mobile station, such as the mobile station 125, to support UE mobility in a mobile network, such as mobility between the GERAN cells 105A-C, the UTRAN cells 110A-C and/or 115A-C, and/or the femto cells 120A-C of mobile network 100. UE mobility within the mobile network 100 may be either UE controlled or network controlled. In the context of the UTRAN portion(s) of the mobile network 100, UE controlled mobility is used in Idle mode and in the CELL_PCH, URA_PCH and CELL_FACH states of RRC Connected mode. Network controlled mobility, on the other hand, is used by the mobile network 100 in the CELL_DCH state of RRC Connected mode. In the context of the GERAN portion(s) of the mobile network 100, UE controlled mobility is used in Idle mode, whereas network controlled mobility is used in Dedicated mode. Furthermore, either UE or network controlled mobility may be used in Packet Transfer mode or Packet Idle mode, where these latter two states are applicable if the mobile station 125 is attached for GPRS services.

In the context of UE controlled mobility, the mobile station 125 chooses a serving cell on which to camp via a process of cell selection and reselection. Cell selection is the process via which the mobile station 125 can choose a serving cell when the mobile station 125 does not currently have a serving cell. For example, the mobile station 125 may not have a serving cell when the mobile station 125 is initially switched on, or when the mobile station 125 is returning from a loss of network coverage, etc. Cell reselection is the process by which the mobile station 125 changes from one serving cell to another serving cell. Typically the cell reselection process involves the mobile station 125 evaluating the signal strength and/or signal quality of the serving cell and a number of candidate neighbor cells. The mobile station 125 can then reselect to one of the neighbor cells that is determined to meet certain criteria based on the foregoing measurements and other parameters, such as hysteresis (which may be standardized and/or signaled by the mobile network 100).

The mobile network 100 guides or assists UE controlled cell selection and reselection by providing control information to the mobile station 125 in broadcast system information messages. The information may include neighbor cell lists to identify the RAT, carrier frequency and, possibly, identity of candidate neighbor cells for cell reselection. The information may also include various offsets, thresholds and/or other parameters to allow the mobile network 100 to affect the cell reselection behavior of the mobile station 125. In a UTRAN cell, such as one of the UTRAN cells 110A-C or 115A-C, broadcast System Information (SI) Block Type 3, 4, 11, 11bis, 12 and/or 19 messages may contain information related to cell reselection. In a GERAN cell, such as one of the GERAN cells 105A-C, various system information messages, including System Information (SI) Type 2 quater (SI-2 quater) messages, may contain information related to cell reselection.

The mobile network 100 may additionally or alternatively provide UE-specific control information in dedicated messages (i.e. non-broadcast messages) sent to mobile station(s), such as the mobile station 125, in one or more of the cells 105A-C, 110A-C, 115A-C and/or 120A-C. For example, in the context of the UTRAN portions of the network, the mobile network 100 may send a UTRAN MOBILITY INFORMATION message including dedicated priority information that controls the relative priority of cells using different carrier frequencies and/or different radio access technologies. This message may be sent to the mobile station 125 in the CELL_FACH or CELL_DCH states, and the dedicated priority information provided in the message may be subsequently used to affect how the mobile station 125 performs cell reselection in the CELL_FACH, CELL_PCH and/or URA_PCH states, and/or in idle mode. In the context of the GERAN portions of the network, the mobile network 100 may send messages, such as Measurement Information (in dedicated mode) or Packet Measurement Order (in packet transfer mode or packet idle mode), as dedicated messages to mobile station(s), such as the mobile station 125, to allow UE-specific parameters to be sent to these mobile station(s).

In the context of network controlled mobility, the mobile network 100 chooses which cell (or cells) are to be used to communicate with the mobile station 125 or, in other words, is (are) to be the serving cell(s) for the mobile station 125. The network decision is typically assisted by radio measurements performed by the mobile station 125 for its current serving cell(s) and also for a number of candidate neighbor cells, which are reported to the mobile network 100. The mobile network 100 may provide the mobile station 125 with relevant information including, for example, one or more neighbor cell lists that identify the RAT, carrier frequency and, possibly, identity of candidate neighbor cells. Additionally or alternatively, the information may include various offsets, thresholds and/or other parameters to allow the mobile network 100 to configure the measurement reporting behavior of the mobile station 125. In a UTRAN cell, such as one of the UTRAN cells 110A-C or 115A-C, this information may be sent to the mobile station 125 in a dedicated manner in a Measurement Control message, and/or may be broadcast in System Information (SI) Block Type 11/12 messages. In a GERAN cell, such as one of the GERAN cells 105A-C, this information may be sent to the mobile station 125 in a dedicated manner in a Packet Measurement Order or a Measurement Information message, and/or may be broadcast in, for example, an SI2quater message.

The femto cells 120A-C, also referred to as home basestations or home Node-Bs, are generally smaller, lower power basestations that connect into the operator's network 100, but may be owned by the user and placed by the user within a home, office, etc. The femto cells 120A-C can improve radio coverage or system capacity in a location in which the operator's network 100 may provide poor or non-existent coverage. In some examples, the owner of a femto cell 120A-C and/or the network operator has control over which mobile stations, such as the mobile station 125, are permitted to obtain service via the femto cell, with other users being denied access. In at least some deployments of 3G or UTRAN femto cells, such as the femto cells 120A-C, the operator configures the femto cells to operate on carrier frequencies different from those used by the operator's macro cell network, which corresponds to the macro cells 105A-C, 110A-C and 115A-C illustrated in the example of FIG. 1. Additionally, the operator's macro 2G and 3G cells (e.g., the macro cells 105A-C, 110A-C and 115A-C in the example of FIG. 1), are configured to list the femto cells frequency (and/or their frequencies) in broadcast system information.

For 3GPP Release 8 and later releases, the 3GPP specifications introduced closed subscriber group (CSG) functionality to improve and standardize operation of femto cells. As part of this functionality, a mobile station, such as the mobile station 125, supporting CSG is to be able to find a CSG cell that it has previously accessed without any RAT, frequency, or identity information of the CSG cell being provided by the operator's macro cell network. Instead, such a mobile station is to perform an implementation-specific autonomous search function to find the CSG cell. However, such functionality is generally limited to newer mobile stations. To enable femto cells to be used by legacy mobile station that do not support the autonomous search functionality, and to enable mobile stations that support CSG to efficiently locate CSG cells in general, operators may include information relating to such cells (such as the femto cell frequency or frequencies, physical layer identity ranges, etc.) in broadcast system information.

The example inter-frequency measurement techniques disclosed herein can enable the mobile station 125 to determine for which frequencies (and cells) measurements are to be performed when the mobile network 100 provides measurement configuration information (e.g., such as one or more neighbor cell lists) that exceeds the monitoring capabilities of the mobile station 125. For example, in inter-system (e.g., 2G & 3G) deployment scenarios, network operators can configure neighbor cells lists to request a multi-RAT mobile station, such as the mobile station 125, to measure many UTRAN/3G frequencies from a GERAN/2G cell. However, according to Section 6.6.4 (relating to idle mode measurements) and Section 7.3 (for measurements during dedicated mode) of 3GPP Technical Specification (TS) 45.008, Radio Subsystem Link Control, v10.0.0, March 2011, which is incorporated by reference in its entirety, a multi-RAT mobile station shall be able to monitor cells from UTRAN on up to three (3) frequency division duplex (FDD) frequencies and on up to three (3) time division duplex (TDD) frequencies. Under the existing 3GPP specifications, mobile station behavior is not specified if the number of UTRAN/3G frequencies or cells (e.g., in the 3G cell reselection list) exceeds the mobile station's monitoring capabilities as defined in 3GPP TS 45.008 (see e.g., 3GPP TS 44.018, v10.2.0, March 2011, sub-clause 3.4.1.2.1.7, which is incorporated herein by reference in its entirety). As such, in some prior 3GPP-compliant networks, when a network operator has configured its GERAN/2G cells to list cells using more than three (3) UTRAN (FDD or TDD) frequencies, mobile stations in the network may simply pick just the first three (3) frequencies (e.g., specified in the form of UTRA absolute radio frequency channel numbers, or UARFCNs) given in the SI2-quater information transmitted by the GERAN/2G network, and ignore the rest of the frequencies.

Additionally, in a 3G (UTRAN) deployment, or an inter-system (e.g., 2G&3G) deployment, the signaling defined in 3GPP TS 25.331, Radio Resource Control (RRC) Protocol Specification, v10.3.1, March 2011, which is incorporated herein by reference in its entirety, is flexible and enables up to 32 UTRAN inter-frequency cells to be configured (see 3GPP TS 25.331, section 10.3.7.13). In theory, all of these 32 cells could be on different UTRAN carrier frequencies, thus allowing 32 different UTRAN carrier frequencies to be deployed. However, deployment of such a large number of UTRAN carrier frequencies is generally not practical and, instead, the number of different UTRAN carriers actually deployed in a network might be two (2) or three (3). 3GPP TS 25.133, Requirements for Support of Radio Resource Management (FDD), v10.1.0, March 2011, which is incorporated by reference herein in its entirety, specifies mobile station (UE) performance requirements for measurements, cell reselection, handover, etc., when the mobile station (UE) is operating in FDD mode. For example, section 4.2.2.8 of 3GPP TS 25.133 provides that the mobile station must be capable of monitoring 32 inter-frequency cells, including FDD cells on a maximum two (2) additional carriers, and if the mobile station also supports TDD mode, TDD cells distributed on up to three (3) TDD carriers. It is possible that a network operator could configure the system information to include more than two (2) inter-frequency UTRAN FDD carriers and/or more than three (3) UTRAN TDD carriers even though a mobile station is required by the 3GPP specification to be able to monitor cells from just two (2) UTRAN FDD carriers and three (3) UTRAN TDD carriers. If this occurs, the existing 3GPP specifications and, in particular, 3GPP TS 25.331, section 8.6.7.14, specify that the mobile station is to monitor at least the cells from the first N carriers listed in the system information, but permits the mobile station to ignore all further carriers. The value of N is specified within the mobile station (UE) performance requirements provided in 3GPP TS 25.133.

Furthermore, 3GPP TS 25.123, Requirements for Support of Radio Resource Management (TDD), v10.1.0, March 2011, which is incorporated by reference herein in its entirety, specifies mobile station (UE) performance requirements for measurements, cell reselection, handover, etc., when the mobile station (UE) is operating in TDD mode. The requirements specified in 3GPP TS 25.123 for TDD mode generally mirror those specified in 3GPP TS 25.133 for FDD mode. However, one difference is that for a mobile station (UE) camped on a UTRAN TDD 1.28 mega-chip per second (Mcps) cell, the mobile station (UE) is to be able to measure 32 inter-frequency cells, including TDD mode cells on up to at least 8 additional TDD carriers. Thus, for operation in UTRAN TDD 1.28 Mcps mode, the mobile station (UE) is required to measure on an increased number of frequencies compared to operation in FDD mode.

Table 1 summarizes of the measurement performance requirements, in terms of the number of carrier frequencies that a UE is required to measure, for different cases according to the existing 3GPP specifications.

TABLE 1

| RAT/mode of cell on which UE is camped | Applicable 3GPP Specification | Number of frequencies UE is required to measure | | |
|---|---|---|---|---|
| | | inter-frequencies | inter-RAT/mode FDD frequencies | inter-RAT/mode TDD 1.28 Mcps frequencies |
| UTRA FDD | TS 25.133 | 2 | n/a | 3 |
| UTRA TDD 1.28 Mcps | TS 25.123 | 8 | 3 | n/a |
| GERAN | TS 45.008 | n/a | 3 | 3 |

The existing 3GPP specifications, and the associated measurement performance requirements listed in Table 1, may be acceptable for prior mobile networks deployed with at most three (3) UTRAN TDD carrier frequencies and at most three (3) UTRAN FDD carrier frequencies. In such prior networks, the network operator can configure all deployed UTRAN carrier frequencies to be listed in the system information of its 2G cells, and mobile stations (UEs) camping on these 2G cells will have sufficient monitoring capabilities to be able to measure and reselect to any of the 3G cells on any of these UTRAN carrier frequencies. Similarly, the network operator can configure the system information in each 3G FDD cell to list the other 2 UTRAN FDD carrier frequencies as inter-frequency carriers. This operation has been acceptable for early 3G FDD deployments as network operators have generally deployed three (3) or fewer UTRAN carriers because, for example, operator have not owned spectrum licenses for more than three (3) carriers, and/or there may not have been sufficient capacity demand to justify the deployment of more carriers.

However, a network operator may wish deploy more than three (3) UTRAN carriers in a mobile network, such as the mobile network 100 of the illustrated example, for at least one or more of the following reasons. First, new spectrum is becoming available for 3 G operation. The existing 3GPP specifications define 17 UTRA FDD bands, and there is ongoing work to define further bands. Operators are acquiring licenses for spectrum in these new bands, and bands used for older radio technologies are also being re-farmed for 3 G operation. Second, mergers, acquisitions and RAN-sharing agreements provide opportunities for operators to increase the number of available carrier bands that can be deployed in their networks. Third, the use of femto cells generally requires the availability of at least one additional UTRAN carrier separate from the carrier used for the macro cells in an operator's network. Fourth, low chip rate (1.28 Mcps) UTRA TDD networks (also referred to as time division synchronous code division multiple access, or TD-SCDMA, networks) use a narrower channel bandwidth of 1.6 MHz, as compared to the 5 MHz used for UTRA FDD networks. Consequently, for a given amount of radio spectrum, network operators can deploy more UTRAN TDD carrier frequencies than UTRA FDD carrier frequencies. As described above, for operation within TDD 1.28 Mcps mode, the UE is expected to measure an increased number of frequencies as compared to operation within FDD mode, but this expectation is not consistent with the existing performance requirements listed in Table 1 for a mobile station (UE) camped on a GERAN (2G) or UTRAN FDD (3G) cell and measuring UTRAN TDD (3G) 1.28 Mcps cells.

For mobile networks, such as a network similar to the mobile network 100 but in which more than three (3) UTRAN carriers are deployed, the prior approach in which a mobile station ignores the signaled UTRAN carrier frequencies after the first three (3) in the list can have disadvantages. For example, assume that a mobile station is camped on a GERAN (2G) cell and, in the location of this UE, the only carrier offering UTRAN (3G) coverage is one that is ignored by the mobile station because it is not among the first three (3) listed frequencies. In such a scenario, the mobile station will be unable to obtain UTRAN (3G) coverage and, thus, will be unable to access the higher data rate services available in the UTRAN (3G) cell. As another example, even if a mobile station is able to obtain service from one of the first three (3) listed UTRAN carrier frequencies, the mobile station may be limited to using a less optimal UTRAN (3G) cell if a more optimal UTRAN (3G) cell is on a carrier frequency that is not among the first three (3) frequencies and, thus, is ignored by the mobile station. Furthermore, in some scenarios, a mobile station employing the existing inter-frequency measurement approach of ignoring carrier frequencies that are not in the first three (3) listed frequencies may be unable to reselect to the subscriber's own femto cell (because its frequency is ignored) and, thus, may be unable to obtain the benefits of using a femto cell (e.g. such as not being able to access the reduced calling rates offered when by a femto cell).

Table 2 contains an example log collected from a commercial network that further illustrates the limitations of prior inter-frequency measurement approaches in a mobile network supporting more than three (3) UTRAN frequencies. The example log of Table 2 corresponds to a mobile device in a dense 3G femto cell environment that has performed cell reselection to a 2G cell and then is measuring 3G cells from the selected 2G cell. As illustrated in Table 2, the SI2-quarter message configures the following five (5) UARFCNs: UARFCN 462, UARFCN 487, UARFCN 4358, UARFCN 4383 and UARFCN 4457. The mobile device conforms to the prior inter-frequency measurement approach and, thus, considers only the first three UARFCNs from SI2-Quarter. As such, the mobile station performs measurements on the first three UARFCNs (462, 487 and 4358), and ignores the last two UARFCNs (4383, 4457). Ironically, during operation, the mobile station had moved to its 2G cell from a 3G having UARFCN 4457, but it could not return to that same cell because the mobile station ignored that cell's frequency per the prior inter-frequency measurement approach.

TABLE 2

SYSTEM INFORMATION TYPE 2 QUATER
Utran FDD description struct:
FDD-ARFCN: 462
FDD_Indic0: 0
NR_OF_FDD_CELLS: 3
FDD_CELL_INFORMATION_Field: (28 bits)
Scrambling Code: 0x02c Diversity: 0
Scrambling Code: 0x177 Diversity: 0
Scrambling Code: 0x179 Diversity: 0
FDD-ARFCN: 487
FDD_Indic0: 0
NR_OF_FDD_CELLS: 3
FDD_CELL_INFORMATION_Field: (28 bits)
Scrambling Code: 0x02c Diversity: 0
Scrambling Code: 0x177 Diversity: 0
Scrambling Code: 0x179 Diversity: 0
FDD-ARFCN: 4358
FDD_Indic0: 0
NR_OF_FDD_CELLS: 3
FDD_CELL_INFORMATION_Field: (28 bits)
Scrambling Code: 0x02c Diversity: 0
Scrambling Code: 0x177 Diversity: 0
Scrambling Code: 0x179 Diversity: 0
FDD-ARFCN: 4383
FDD_Indic0: 0
NR_OF_FDD_CELLS: 3
FDD_CELL_INFORMATION_Field: (28 bits)
Scrambling Code: 0x02c Diversity: 0
Scrambling Code: 0x177 Diversity: 0
Scrambling Code: 0x179 Diversity: 0
FDD-ARFCN: 4457
FDD_Indic0: 0
NR_OF_FDD_CELLS: 6
FDD_CELL_INFORMATION_Field: (52 bits)
Scrambling Code: 0x1f8 Diversity: 0
Scrambling Code: 0x1f9 Diversity: 0
Scrambling Code: 0x1fa Diversity: 0
Scrambling Code: 0x1fb Diversity: 0
Scrambling Code: 0x1fc Diversity: 0
Scrambling Code: 0x1fd Diversity: 0

Table 3 contains another example log collected from another commercial network that illustrates yet another limitation of prior inter-frequency measurement approaches in a mobile network supporting more than three (3) UTRAN frequencies. The example log of Table 3 corresponds to a mobile device operating in a 2G cell with a neighboring UTRAN TDD network. As illustrated in Table 3, the SI2-quarter message indicates that there are nine (9) neighboring 3G frequencies for which the mobile station is being requested to perform measurements. However, if the mobile station implements the existing inter-frequency measurement approach, the mobile station would measure only the first three (3) listed frequencies and ignore the rest (see Table 1).

TABLE 3

SYSTEM INFORMATION TYPE 2 QUATER
  3G Neighbour cell description:
    Utran FDD description struct:
      FDD-ARFCN: 0
        FDD_Indic0: 0
        NR_OF_FDD_CELLS: 0
        FDD_CELL_INFORMATION_Field: (0 bits)
    Utran TDD description struct:
      Bandwidth_TDD: 1
      TDD-ARFCN: 10055
        TDD_Indic0: 0
        NR_OF_TDD_CELLS: 31
      TDD-ARFCN: 10063
        TDD_Indic0: 0
        NR_OF_TDD_CELLS: 31
  3G Measurement parameters description:
    Qsearch_I: 8 (−78 dB)
    Qsearch_C_Initial: 0 (use Qsearch_I)

TABLE 3-continued

```
        TDD_Qoffset: 8
        TDD_MULTIRAT_REPORTING: 0
    GPRS 3G Measurement Parameters description:
        Qsearch_P: 8 (−78 dB)
        3G_SEARCH_PRIO: 0
SYSTEM INFORMATION TYPE 2 QUATER
    BA_IND: 1
    3G_BA_IND: 0
    MP_CHANGE_MARK: 0
    SI2quater_INDEX: 1
    SI2quater_COUNT: 2
    3G Neighbour cell description:
        Utran FDD description struct:
            FDD-ARFCN: 0
                FDD_Indic0: 0
                NR_OF_FDD_CELLS: 0
                FDD_CELL_INFORMATION_Field: (0 bits)
        Utran TDD description struct:
            Bandwidth_TDD: 1
            TDD-ARFCN: 10071
                TDD_Indic0: 0
                NR_OF_TDD_CELLS: 31
            TDD-ARFCN: 10080
                TDD_Indic0: 0
                NR_OF_TDD_CELLS: 31
            TDD-ARFCN: 10088
                TDD_Indic0: 0
                NR_OF_TDD_CELLS: 31
            TDD-ARFCN: 10096
                TDD_Indic0: 0
                NR_OF_TDD_CELLS: 31
SYSTEM INFORMATION TYPE 2 QUATER
    BA_IND: 1
    3G_BA_IND: 0
    MP_CHANGE_MARK: 0
    SI2quater_INDEX: 2
    SI2quater_COUNT: 2
    3G Neighbour cell description:
        Utran FDD description struct:
            FDD-ARFCN: 0
                FDD_Indic0: 0
                NR_OF_FDD_CELLS: 0
                FDD_CELL_INFORMATION_Field: (0 bits)
        Utran TDD description struct:
            Bandwidth_TDD: 1
            TDD-ARFCN: 10104
                TDD_Indic0: 0
                NR_OF_TDD_CELLS: 31
            TDD-ARFCN: 10112
                TDD_Indic0: 0
                NR_OF_TDD_CELLS: 31
            TDD-ARFCN: 10120
                TDD_Indic0: 0
                NR_OF_TDD_CELLS: 31
```

Figure 2:
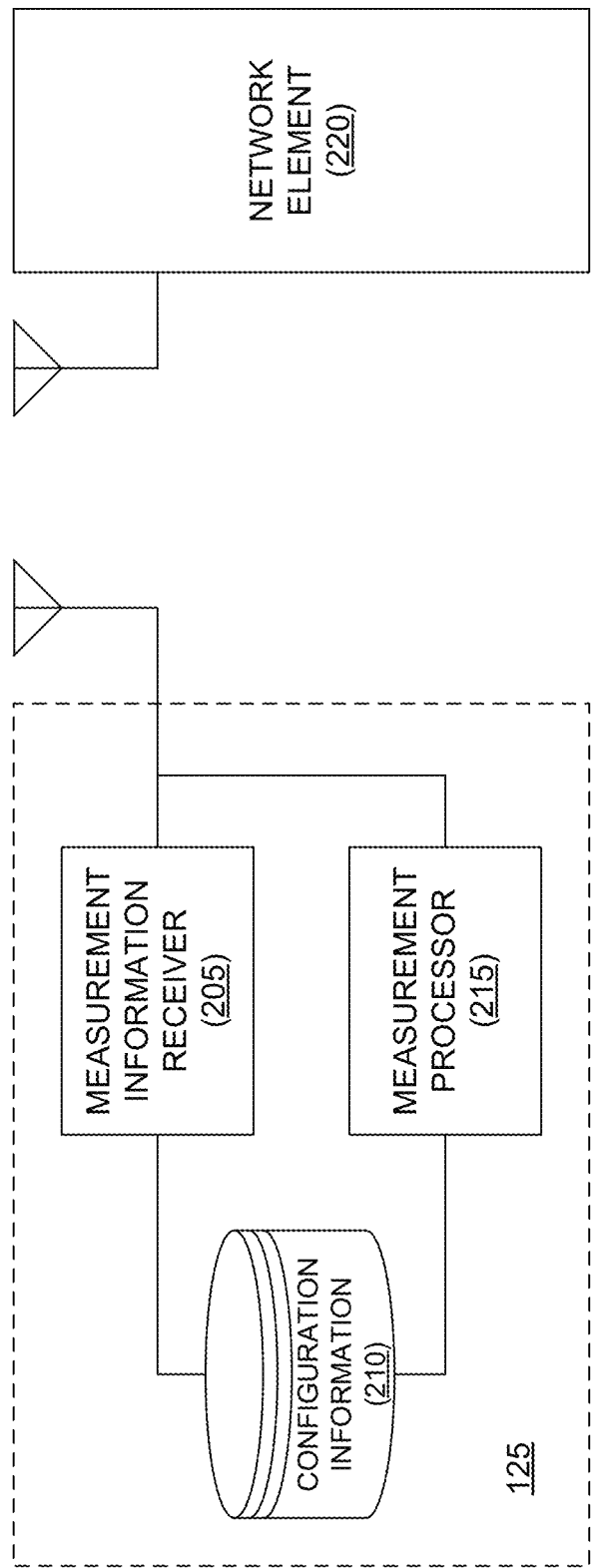
FIG. 2 is a block diagram of an example mobile station and an example network element that can be used to implement the example mobile network of FIG. 1.

FIG. 2 illustrates an example implementation of the mobile station 125 of FIG. 1 that supports inter-frequency measurement processing as disclosed herein. The mobile station 125 may be implemented by any type of mobile station or UE equipment or, more generally, any type of wireless device, such as a smartphone, a mobile telephone device that is portable, a mobile telephone device implementing a stationary telephone, a personal digital assistant (PDA), etc. As discussed above, prior mobile stations may implement an existing inter-frequency measurement approach in which inter-frequency measurement is performed for up to the first three (3) UTRAN frequencies in FDD mode and/or the first three (3) UTRAN frequencies in TDD mode that are signaled by the network, with any additional signaled UTRAN frequencies being ignored by the mobile station. Unlike such prior mobile stations, the mobile station 125 of the illustrated example implements one or more example inter-frequency measurement techniques, and/or combinations thereof, that enable prioritization of frequencies for which measurement is to be performed, with the prioritization being based, at least in part, on information separate from the list of frequencies (e.g., the list of neighbor cell information) signaled by the network. In other words, when the set of frequencies signaled by the mobile network 100 to the mobile station 125 exceeds the monitoring capabilities of the mobile station 125 (e.g., such as when the number of frequencies for cells operating in a certain modes exceeds a particular number, such as three (3) for FDD mode and three (3) or eight (8) for TDD mode), the mobile station can prioritize measurement of a subset of these frequencies based, at least in part, on information other than just selecting the first two (2) or three (3) frequencies listed in the signaled set of frequencies.

For example, to implement inter-frequency measurement processing as disclosed herein, the mobile station 125 illustrated in the example of FIG. 2 includes an example measurement information receiver 205 to receive information, such as one or more neighbor cell lists, specifying one or more frequencies of neighbor cells for which the network 100 expects measurements to be performed. The measurement information receiver 205 can be implemented by any type of receiver capable of receiving and decoding broadcast and/or dedicated signaling messages conveying the list(s) specifying the set of one or more frequencies for which measurements for UE controlled and/or network controlled cell selection and/or reselection are to be performed. For example, the measurement information receiver 205 can correspond to any implementation capable of receiving and decoding broadcast UTRAN System Information Block (SIB) messages (e.g., Type 3, 4, 11, 11bis, 12 and/or 19 messages), broadcast GERAN SI messages (e.g., SI-2 quarter messages), dedicated UTRAN MOBILITY INFORMATION messages, GERAN Measurement Information and/or GERAN Packet Measurement Order messages, etc.

The example mobile station 125 illustrated in FIG. 2 also includes an example configuration information storage 210 to store the inter-frequency measurement configuration information (e.g., the neighbor cell list(s)) obtained from the network 100. The configuration information storage 210 can be implemented by any type and/or combination of memory and/or storage technology, such as the volatile memory 1518 and/or the mass storage device 1530 of the processing system 1500 illustrated in FIG. 15, which is described in greater detail below. The configuration information storage 210 can store the inter-frequency measurement configuration information obtained from the network 100 in any appropriate data format.

The example mobile station 125 illustrated in FIG. 2 further includes an example measurement processor 215 to perform one or more example techniques disclosed herein for performing inter-frequency measurements. In the illustrated example, the measurement processor 215 obtains, from the configuration information storage 210, a set of frequencies that have been signaled by the network 100 in one or more lists (e.g., neighbor cell list(s)) specifying the frequencies for which measurements are to be performed (e.g., for cell selection and/or re-selection). The example technique(s), or combination(s) of techniques, performed by the measurement processor 215 involve prioritizing measurement of a subset of the signaled set of frequencies based, at least in part, on information separate from of list of specified frequencies obtained from the network 100. An example implementation of the measurement processor 215 is illustrated in FIG. 3, which is described in greater detail below.

Figure 5:
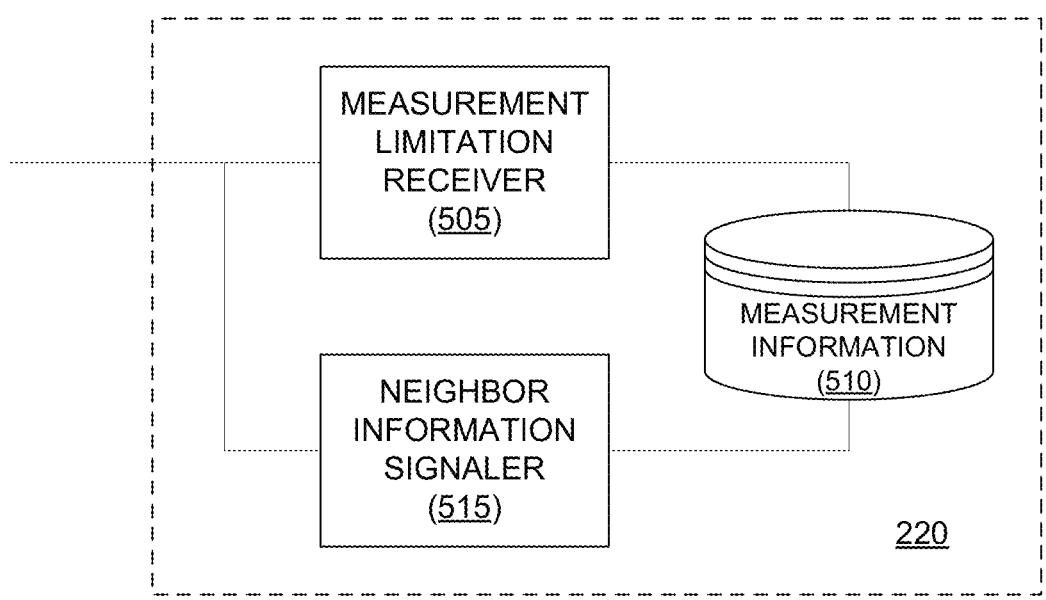
FIG. 5 is a block diagram of an example implementation of at least a portion of the example network element of FIG. 2.

FIG. 2 also illustrates an example network element 220 that can be used to implement at least some of the example inter-frequency measurement processing techniques disclosed herein. For example, the network element 220 can support receiving measurement limitation information signaled by the mobile station 125, and processing such signaled measurement limitation information to revise the neighbor cell list(s) that are sent to mobile stations, such as the mobile station 125, to specify the set of frequencies for which measurements are to be performed. The network element 220 can correspond to, for example, an example base station subsystem (BSS), a base station transceiver (BTS), a base station controller (BSC), a packet control unit (PCU), a network cell, a Node B, a radio network controller (RNC), etc., or a combination thereof. An example implementation of the network element 220 is illustrated in FIG. 5, which is described in greater detail below.

Figure 3:
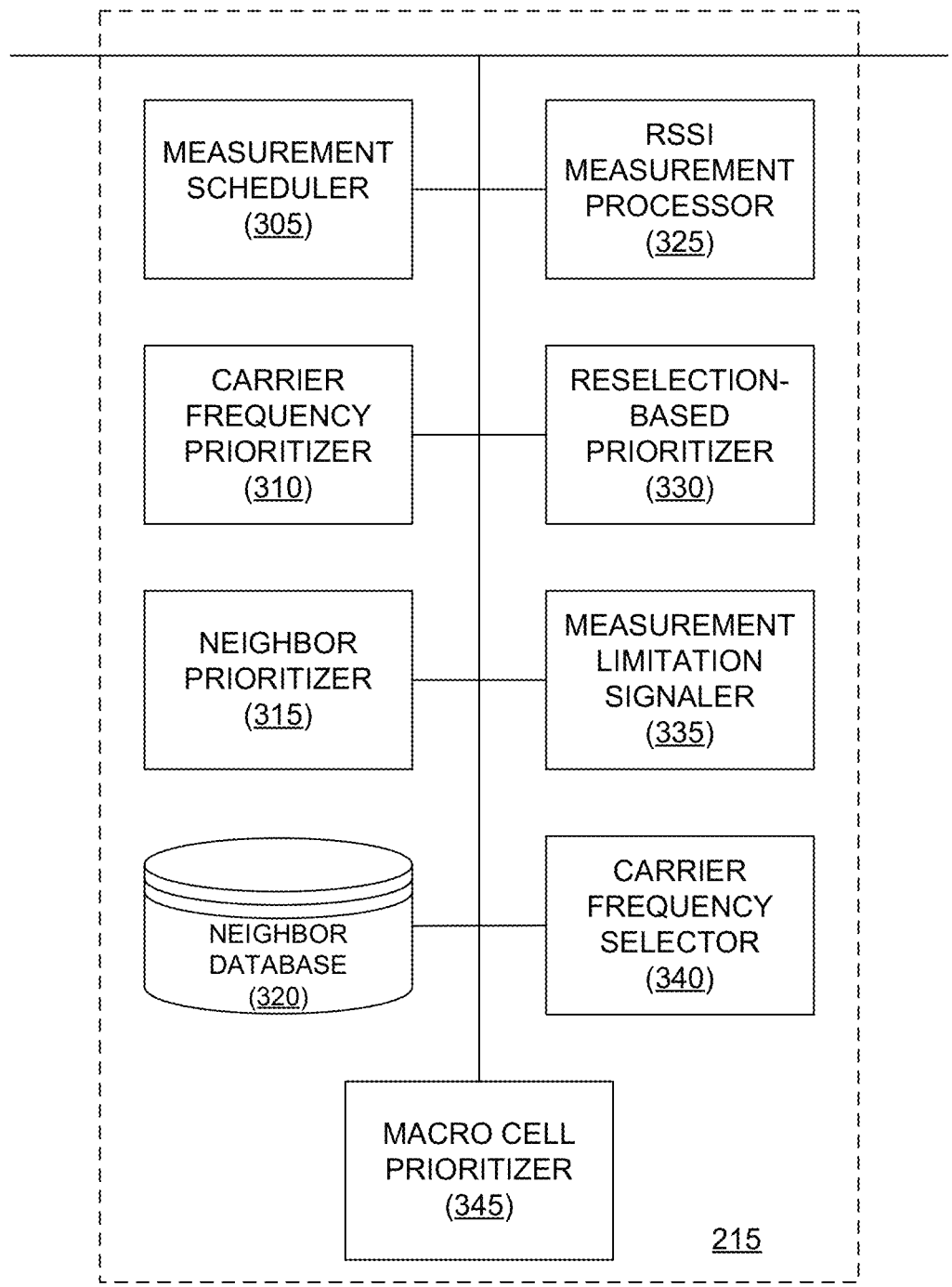
FIG. 3 is a block diagram of an example implementation of at least a portion of the example mobile station of FIG. 2.

An example implementation of the measurement processor 215 of FIG. 2 is illustrated in FIG. 3. The example measurement processor 215 of FIG. 2 includes an example measurement scheduler 305, an example carrier frequency prioritizer 310, an example neighbor prioritizer 315 in conjunction with an example neighbor database 320, an example RSSI measurement processor 325, an example reselection-based prioritizer 330, an example measurement limitation signaler 335, an example carrier frequency selector 340 and an example macro cell prioritizer 345, each of which implement a different example technique for performing inter-frequency measurement processing as disclosed herein. Although the example measurement processor 215 of FIG. 2 is shown to include all of the measurement scheduler 305, the carrier frequency prioritizer 310, the neighbor prioritizer 315, the neighbor database 320, the RSSI measurement processor 325, the reselection-based prioritizer 330, the measurement limitation signaler 335, the carrier frequency selector 340 and the macro cell prioritizer 345, in other examples the measurement processor 215 could include just one or some of these elements (e.g., to implement one or different combinations of the example disclosed techniques).

Turning to FIG. 3, for scenarios in which the mobile network 100 includes GERAN (2G) network cell(s) 105A-C that signal neighbor cell list(s) containing more than three (3) UTRAN frequencies, or UTRAN (3G) cell(s) 110A-C and/or 115A-C that signal neighbor cell list(s) containing more than two (2) UTRAN inter-frequencies, the measurement scheduler 305 can schedule measurements to enable the mobile station 125 to perform measurements on all of the UTRAN carrier frequencies that are configured in the neighbor cell list information, rather than limiting measurement to just 2 or 3 frequencies as in the prior approaches. There are at least two variants of measurement scheduling that can be implemented by the measurement scheduler 305. In a first variant, the measurement scheduler 305 causes the mobile station 125 to perform measurements on all of the frequencies specified in the signaled neighbor cell lists with the same performance (e.g., in terms of the rate at which measurements are performed and the corresponding delay in detecting and reselecting to a neighbor cell) as specified by the existing 3GPP specifications for a maximum of 2 UTRAN inter-frequencies (from a UTRAN/3G cell) and 3 UTRAN frequencies (from a GERAN/2G cell). To achieve this performance, the first measurement scheduling variant as implemented by the measurement scheduler 305 may necessitate increases in complexity and/or power consumption of the mobile station 125 to be able to support more inter-frequency measurements with the same performance as existing mobile stations.

In a second variant, the measurement scheduler 305 causes the mobile station 125 to perform measurements on all of the specified frequencies, but with a performance that is relaxed compared to the performance specified by the existing 3GPP specifications for a maximum of 2 UTRAN inter-frequencies (for measurements from a UTRAN/3G cell) and 3 UTRAN frequencies (for measurements from a GERAN/2G cell). In other words, under the second variant, the measurement scheduler 305 schedules inter-frequency measurements at, for example, a reduced rate scaled proportionally to the number of frequencies on which the mobile station 125 is to perform measurements. Thus, the second measurement scheduling variant can be used to increase the number of UTRAN frequencies for which measurements are performed while maintaining similar complexity and power consumption as in prior mobile stations. However, the second measurement scheduling variant may exhibit reduced measurement performance and, for example, longer reselection delays.

Measurement scheduling as performed by the measurement scheduler 305 can be combined with one or more of the frequency prioritization techniques described in greater detail below. For example, measurement scheduling as performed by the measurement scheduler 305 could be used to increase the number of frequencies that the mobile station 125 is required to measure (e.g., by 1 or 2 frequencies) and then one or more of the prioritization techniques described below could be used if the number of frequencies indicated by the network 100 still exceeds the new limit.

The carrier frequency prioritizer 310 can be included in the measurement processor 215 to prioritize measurements for one or more UTRAN carrier frequencies that the mobile station 125 last visited (or, in other words, most recently visited). In general, the last visited UTRAN carrier frequency refers to the UTRAN carrier frequency of the UTRAN cell most recently used by the mobile station 125 or, in other words, to which the mobile station 125 was most recently associated. The UTRAN cell to which the mobile station 125 was most recently associated may be the cell on which the mobile station 125 was camped in idle mode, or on which the mobile station 125 was camped in the URA_PCH, CELL_FACH or CELL_FACH states of connected mode. Additionally, a UTRAN cell to which the mobile station 125 was most recently associated may be a cell with which the mobile station 125 was connected in the CELL_DCH state of connected mode.

For example, the carrier frequency prioritizer 310 could prioritize the last visited UTRAN carrier frequency, in which case the carrier frequency prioritizer 310 causes the mobile station 125 to measure cells on this UTRAN carrier frequency regardless of the frequency's location in the neighbor cell list (assuming this last visited frequency is at least somewhere in the list). The carrier frequency prioritizer 310 could then permit measurement on other UTRAN carrier frequencies in the neighbor cell list (for example, based on the order in which the UTRAN carrier frequencies appear in the list, and/or based on other prioritization techniques, such as those described below). Prioritization of the last visited UTRAN frequency can address the problem experienced in prior systems in which a prior mobile station may not be able to return to its last visited UTRAN cell because the frequency of that cell is ignored by the mobile station.

The carrier frequency prioritizer 310 can implement one or more variants and/or additions to the principle of prioritizing the last visited UTRAN carrier frequency. Furthermore, these variants/additions can be combined in any manner. For example, the carrier frequency prioritizer 310 could prioritize more than just the last visited UTRAN carrier frequency, and could instead store and prioritize more than one (e.g., 2 or 3 or more) of the most recent visited UTRAN carrier frequencies (e.g., with the prioritizing being in reverse chronological order beginning with the most recently visited UTRAN frequency).

As described above, the carrier frequency prioritizer 310 may consider that the UTRAN cell to which the mobile station 125 was most recently associated corresponds to the cell on which the mobile station 125 was most recently camped. In some examples, the carrier frequency prioritizer 310 could further qualify the most recently associated UTRAN cell(s) to correspond to only cell(s) on which the mobile station 125 was camped to obtain normal service. This would avoid the carrier frequency prioritizer 310 from prioritizing the frequencies of UTRAN cells with which the mobile station 125 was camped, but was unable to obtain normal service. For example, the mobile station 125 may camp on a cell for emergency services when no other cell offering normal service is available. Normal service could be defined in a number of ways. For example, normal service could follow the definition of sub-clause 3.2.1 of 3GPP TS 43.022, Functions Related to Mobile Station (MS) in Idle Mode and Group Receive Mode, v10.0.0, March 2011, and, thus, mean the opposite of a limited service state. As another example, normal service could mean that the mobile station 125 was able to access both packet switched (PS) and circuit switched (CS) services in the cell (in other words, the mobile station 125 was successfully attached in both CS and PS domains). Additionally or alternatively, the carrier frequency prioritizer 310 could use one or more other requirement in terms of the service(s) available to the mobile station 125 to determine whether the normal service is available in a particular cell. In some examples, when the mobile station 125 is already in a limited service state, the carrier frequency prioritizer 310 ignores the restriction that the most recently associated UTRAN cell(s) only correspond to cell(s) on which the mobile station 125 was camped to obtain normal service.

In some examples, the carrier frequency prioritizer 310 clears its stored list of the one or more most recently visited UTRAN frequencies under some situations. For example, the carrier frequency prioritizer 310 could clear its list of most recently visited UTRAN frequencies when the mobile station 125 is powered off or on, (e.g., because the mobile station 125 may be powered on in a completely different location such that the stored information may not correspond to the network deployment in the new location.) Additionally or alternatively, the carrier frequency prioritizer 310 could clear its list of most recently visited UTRAN frequencies when a new (PLMN) is selected (e.g., because the stored information may not correspond to the network deployment of the new PLMN). Additionally or alternatively, the carrier frequency prioritizer 310 could remove an entry for a particular UTRAN carrier frequency from its list of most recently visited UTRAN frequencies if no UTRAN cell has been detected on that carrier frequency for some period of time. This could occur if, for example, the mobile station 125 has moved to a location where that UTRAN carrier frequency is not deployed and, as such, it no longer makes sense for the mobile station 125 to prioritize that carrier frequency. A variant of the condition for clearing an entry in the list could be that the mobile station 125 has not camped on a cell on that carrier frequency for some period of time.

In some examples, for UTRAN carrier frequencies included in the neighbor cell list signaled by the network 100 but that are not prioritized by the carrier frequency prioritizer 310 (e.g., because they are not among the one or more last visited carrier frequencies), the carrier frequency prioritizer 310 can cause the mobile station 125 to perform a round-robin measurement process to search for cells on these remaining frequencies. If, for example, the mobile station 125 detects a cell on one of these remaining UTRAN carrier frequencies, then the carrier frequency prioritizer 310 can cause the mobile station 125 to continue to perform measurements in that frequency. However, if the mobile station 125 does not detect any cells on a remaining UTRAN carrier frequency, then the carrier frequency prioritizer 310 can cause the mobile station 125 to move on to search on another remaining UTRAN carrier frequency.

In some examples, the carrier frequency prioritizer 310 can de-prioritize one or more UTRAN carrier frequencies included in the neighbor cell list signaled by the network 100. For example, the carrier frequency prioritizer 310 can de-prioritize a UTRAN frequency if the mobile station 125 previously was unsuccessful in an attempt to camp and register on a cell of that frequency. Examples of cases where the mobile station 125 may be unsuccessful in an attempt to camp and register on a cell include, but are not limited to, when the mobile station 125 attempts to camp on a cell and determines that the cell belongs to a forbidden PLMN or forbidden location area (LA) for roaming, or when the mobile station 125 attempts to register (e.g. to perform a location or routing area update) on a cell and is rejected by that cell. As an example of the latter, if the cell is a CSG cell, the mobile station 125 may be rejected because it does not have a valid CSG subscription.

In some examples, as a general rule, the carrier frequency prioritizer 310 can additionally or alternatively de-prioritize frequencies on which CSG cells are known to operate because there is a reasonable likelihood that (i) the coverage of such cells will be limited, and (ii) the mobile station 125 may not be permitted access to such cells. In some examples, such UTRAN frequencies may be differentiated (and prioritized accordingly) depending on whether CSG cells and macro cells are known to co-exist on the same frequency or whether the frequency is a CSG-specific frequency. For example, mixed frequencies can be ranked higher than CSG-only frequencies. In some examples, UTRAN frequencies on which CSG cells are known to operate may be differentiated (and prioritized accordingly) depending on whether access to CSG cells on that frequency has recently been permitted or rejected. For example, frequencies on which access to CSG cells has succeeded may be ranked higher than frequencies on which CSG access has failed.

In some examples, the carrier frequency prioritizer 310 maintains a list of UTRAN frequencies that it has been requested by the network to measure (e.g., which may correspond to a set of frequencies signaled via one or more neighbor cell lists). In such an example, the carrier frequency prioritizer 310 may associate each UTRAN frequency in its maintained list with a binary classification, such as marking of 'measure' or 'do not measure' to indicate which frequencies have been prioritized for measurement. Additionally or alternatively, the carrier frequency prioritizer 310 may associate each UTRAN frequency in its maintained list with a ranking such that frequencies with higher ranking are the frequencies that would be measured (e.g., within the monitoring capabilities of the mobile station 125). For example, the ranking score may be a rank value (e.g., from 1 to N where there are N frequencies under consideration) or may be a score based on one or more of the prioritization criteria described above.

The neighbor prioritizer 315 can be included in the measurement processor 215 to prioritize measurement of UTRAN frequencies that are likely to actually contain neighbor cells from which the mobile station 125 can obtain service. For example, the neighbor prioritizer 315 can prioritize those UTRAN carrier frequencies that include UTRAN (3G)

cells with which the mobile station 125 was previously associated and that had signaled neighbor cell lists indicating that the current serving cell of mobile station 125 was a neighbor cell. In the illustrated example, as the mobile station 125 is performing cell selection and reselections within the network 100, the neighbor prioritizer 315 can gather data about the relationship(s) between a particular UTRAN carrier frequency and any 2G/3G neighbor cell(s) and store the neighbor relationship(s) in the neighbor database 320. The neighbor database 320 can be implemented by any type and/or combination of memory and/or storage technology, such as the volatile memory 1518 and/or the mass storage device 1530 of the processing system 1500 illustrated in FIG. 15, which is described in greater detail below. The neighbor database 320 can store the neighbor information gathered from the network 100 in any appropriate data format.

For example, when the mobile station 125 is camping in the mobile network 100 on the 3G cell 110B having UTRAN carrier frequency F1, the neighbor prioritizer 315 can record the 2G/3G cells that are listed in the system information signaled by the 3G cell 110B. By listing these 2G/3G cells as neighbor cells of the 3G cell 110B, the network operator is indicating that it expects reselection from the 3G cell 110B to those neighbor 2G/3G cells to be possible. It is reasonable to assume, therefore, that the network operator expects reselection in the opposite direction to also be possible. As such, when the mobile station 125 is later camped on one of those 2G/3G cells, the neighbor prioritizer 315 can intelligently prioritize measurement of the UTRAN carrier frequency F1 corresponding to the 3G cell 110B, thus ensuring that reselection back to the 3G cell 110B is possible. Such prioritization by the neighbor prioritizer 315 can address the problem exhibited by prior mobile network in which a prior mobile station could not return to the UTRAN cell on which it was previously camped (because it had ignored the frequency of that UTRAN cell).

Figure 4:
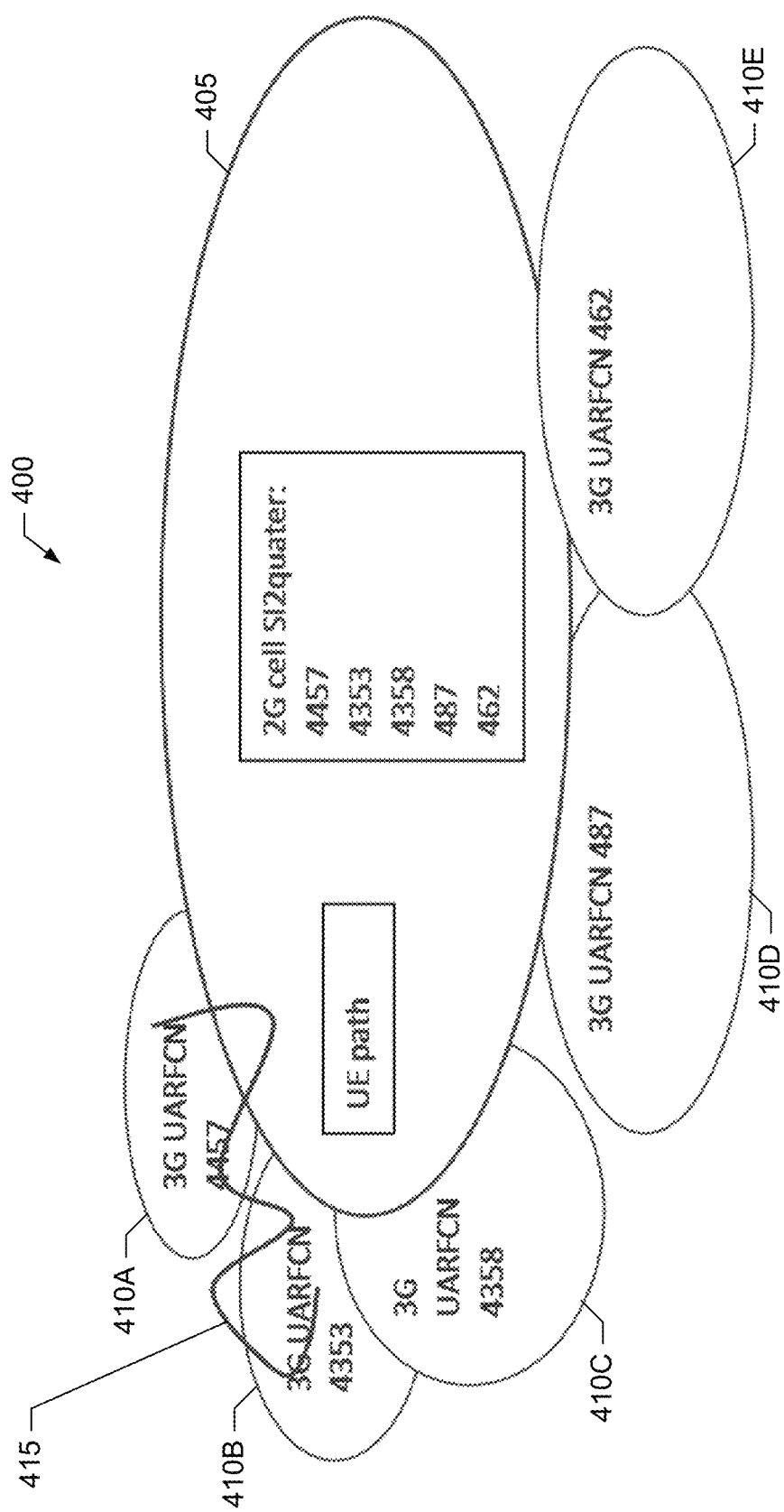
FIG. 4 illustrates an example path followed by the example mobile station of FIG. 2.

An example operation of the neighbor prioritizer 315 in an example multi-RAT mobile network 400 is illustrated in FIG. 4. The mobile network 400 includes a large GERAN (2G) cell 405, which may correspond to a 2G cell deployed in a rural area. The mobile network 400 also includes UTRAN cells 410A-E on different UTRAN frequencies, which may correspond to a multi-frequency deployment in an urban environment. Assume that the mobile station follows an example path 415 as illustrated in FIG. 4. In such an example, when the mobile station 125 is in the 2G cell 405, the neighbor prioritizer 315 will prioritize the 3G cells/UARFCNs it has previously seen and which have considered the 2G cell 405 to be a neighbor cell. In the illustrated example of FIG. 4, these UTRAN frequencies prioritized by the neighbor prioritizer 315 are the UARFCNs 4457 and 4353 corresponding to the 3G cells 410A and 410B.

Returning to FIG. 3, the RSSI measurement processor 325 can be included in the measurement processor 215 to perform RSSI measurements on the each frequency in the set of UTRAN carrier frequencies for which measurements have been requested by the network 100 (e.g., via inclusion in the signaled neighbor cell list(s)). The RSSI measurement processor 325 can then prioritize measurement of UTRAN frequencies based on the RSSI measurements (e.g., in order of decreasing RSSI). RSSI measurements are relatively quick to perform (e.g., usually faster than attempting to detect a cell) and can indicate whether there is energy within the channel. In general, the likelihood of detecting a cell on a carrier frequency increases with increasing RSSI. After performing an RSSI measurement on all of the UTRAN carrier frequencies specified by the network 100, the RSSI measurement processor 325 can prioritize further measurement activity on those frequencies with the highest RSSI. The RSSI measurement on all of the specified UTRAN carriers may be repeated at regular intervals to support mobile station mobility and, in particular, scenarios in which the mobile station 125 moves to a location where coverage is available from different carrier frequencies.

The reselection-based prioritizer 330 can be included in the measurement processor 215 to prioritize measurement of UTRAN frequencies based on reselection priorities. In some examples, the mobile network 100 can implement a priority based cell reselection algorithm. If a priority based cell reselection algorithm is deployed in the mobile network 100, then each carrier frequency (from different RATs) is assigned a reselection priority, and the mobile station 125 attempts to camp on the frequency with the highest reselection highest priority. If the mobile station 125 is requested by the network 100 to measure a number of UTRAN (3G) carrier frequencies that exceeds its monitoring capabilities, then the reselection-based prioritizer 330 can cause the mobile station 125 to measure a subset of the UTRAN (3G) carrier frequencies that have the highest reselection priority or priorities (e.g., prioritized in descending order of reselection priority). If different UTRAN carrier frequencies are assigned the same cell reselection priority, then the measurement processor 215 can apply another of the inter-frequency measurement prioritization techniques disclosed herein to determine which frequencies to measure.

The measurement limitation signaler 335 can be included in the measurement processor 215 to detect that the set of frequencies for which the network 100 has indicated measurements are to be performed exceeds the monitoring capabilities of the mobile station 125. The measurement limitation signaler 335 can then indicate to the network 100 that its monitoring capabilities have been exceeded. In some examples, the measurement limitation signaler 335 can also send a prioritized list of UTRAN frequencies to the network 100, with the prioritized list of UTRAN frequencies being determined using one or more of the inter-frequency measurement prioritization techniques disclosed herein. Additionally or alternatively, the measurement limitation signaler 335 could send location information to the network 100 indicating a location of the mobile station 125 and, thus, a location to be associated with a particular prioritized list of UTRAN frequencies.

In such an example, after receiving the measurement limitation information signaled by the measurement limitation signaler 335, the mobile network 100 is responsible for updating the order of the frequencies in the neighbor cell list(s) of the system information messages and/or dedicated messages sent in the relevant cells. An example implementation of the network element 220 of FIG. 2 that is capable of processing the measurement limitation information signaled by the measurement limitation signaler 335 is illustrated in FIG. 5. The example network element 220 of FIG. 5 includes an example measurement limitation receiver 505 to receive measurement limitation information from a mobile station, such as the mobile station 125. The measurement limitation receiver 505 can correspond to any type of receiver capable of receiving and decoding information conveyed in one or more mobile station signaling messages.

The example network element 220 of FIG. 5 also includes an example measurement limitation information database 510 to store the measurement limitation information obtained from mobile stations, such as the mobile station 125, in the mobile network 100. The measurement limitation information stored in the measurement information database 510 can include, for example, prioritized lists of UTRAN frequencies signaled by the mobile stations, location information provided by the mobile stations to be associated with the prioritized lists of UTRAN frequencies, etc. The measurement information database 510 can be implemented by any type and/or combination of memory and/or storage technology, such as the volatile memory 1518 and/or the mass storage device 1530 of the processing system 1500 illustrated in FIG. 15, which is described in greater detail below. The measurement information database 510 can store the measurement limitation information received from one or more mobile stations in any appropriate data format.

The example network element 220 of FIG. 5 also includes an example neighbor information signaler 515 to update the set(s) of frequencies, as well as the order of the frequencies, in the neighbor cell list(s) to be sent to mobile stations, such as the mobile station 125, operating in the mobile network 100. The neighbor information signaler 515 updates the set and order of frequencies included in a neighbor cell list based on the prioritization and/or location information stored in the measurement information database 510. The neighbor information signaler 515 also causes the network element 220 to transmit the updated neighbor cell list(s) in the appropriate system information messages and/or dedicated messages.

In some examples, measurement limitation signaling as performed by the measurement limitation signaler 335 could be implemented in a 3GPP-compliant network by adding this feature as another use case in the 3GPP specifications directed to Self-Organizing Network (SON) functionality, and/or by adding this feature as an extension to the Automated Neighbor Relation (ANR) feature, and/or by including this feature as part of the Minimization of Drive Testing (MDT) feature.

A possible advantage of measurement limitation signaling as performed by the measurement limitation signaler 335 is that, after the order of frequencies in the neighbor cell list(s) is updated in the network 100, even legacy mobile stations with limited inter-frequency measurements capabilities could benefit from the updated order of the frequencies for which the network requests measurements. Also, measurement limitation signaling can be implemented without modifying existing measurements performance requirements.

Returning to FIG. 3, the carrier frequency selector 340 can be included in the measurement processor 215 to prioritize measurement of UTRAN frequencies based on the order in which they appear in the neighbor cell list(s) signaled by the mobile network 100. For example, the carrier frequency selector 340 can be configured to cause the mobile station 125 to always measure the first listed UTRAN carrier frequency provided in a list signaled by the mobile network 100. This functionality can give a network operator some degree of control to ensure that the mobile station 125 is guaranteed to measure at least this one particular carrier frequency included in the list. As such, the operator could choose to place a UTRAN carrier frequency known to provide the best coverage in a particular geographic location as the first frequency in the signaled neighbor cell list.

In some examples, for other UTRAN carrier frequencies listed in the signaled neighbor cell list, the mobile station 125 could apply prioritization in accordance with one or more of the other prioritization techniques disclosed herein to determine a subset of additional frequencies for which measurements are to be performed. Such prioritization can be based on information separate from the signaled neighbor cell lists, such as prioritization based on a list of frequencies with which the mobile station 125 has be recently associated, prioritization based on gathered neighbor cell information, prioritization based on RSSI measurements, prioritization based on cell reselection priorities, etc., or combination(s) thereof.

In some examples, the carrier frequency selector 340 can extend frequency selection to cause the mobile station 125 to measure on the first N UTRAN carrier frequencies listed in the signaled neighbor cell list. If the monitoring capabilities of the mobile station 125 are not exceeded by measuring these first N frequencies, the mobile station 125 could apply prioritization in accordance with one or more of the prioritization techniques disclosed herein, and based on the information described above, to determine a subset of carrier frequencies beyond the first N frequencies for which measurements are to be performed (e.g., up to the limit of the mobile station's monitoring capabilities).

The macro cell prioritizer 345 can be included in the measurement processor 215 to prioritize measurement of UTRAN frequencies based on frequencies in which UTRAN (3G) macro cell(s) are most likely deployed. Many operators deploy their networks such that one or a few carrier frequencies (also referred to as carriers) provide maximum coverage. These carriers can support macro cells with large coverage areas achieved by high power basestations, high mounted antennas, etc. Such a carrier frequency can offer a relatively strong likelihood of identifying a candidate cell for reselection. Thus, the macro cell prioritizer 345 attempts to prioritize such a carrier (or carriers) in the set of UTRAN carrier frequencies that are to be monitored by the mobile station 125.

However, in at least some examples, the broadcast system information does not provide an explicit indication of the macro coverage layer. In such examples, the macro cell prioritizer 345 determines the UTRAN carrier frequency or frequencies most likely to be associated with a macro coverage layer from other information that is available. For example, broadcast system information can provide a cell transmit power level, which the macro cell prioritizer 345 can use to infer the coverage level of the cell. For instance, in a commercial network, the "primaryCPICH-TX-Power" information element in System Information Block 5 set can be set to a number, such as the number "34," representative of the transmission power of the primary common pilot channel (which determines the cell coverage), which in this example means that the primary common pilot channel has a transmission power of 34 dBm. As a further example, the macro cell prioritizer 345 can assume that the UTRAN carrier or carriers having the lowest carrier frequency or frequencies are associated with the macro coverage layer(s). Low frequencies generally have better propagation properties, thereby providing better cell coverage. Thus, operators may choose one or more carriers from a low frequency band for deploying macro cells. Additionally or alternatively, the macro cell prioritizer 345 can assume that the UTRAN carrier or carriers associated with the most neighbor cells in the signaled neighbor cell list(s) are associated with the macro coverage layer(s). A carrier frequency associated with a large number of neighbor cells in a neighbor cell list suggests that this carrier frequency has been planned to provide a high degree of coverage.

While example manners of implementing the mobile station 125 and the network element 220 have been illustrated in FIGS. 2-5, one or more of the elements, processes and/or devices illustrated in FIG. 2-5 may be combined, divided, re-arranged, omitted, eliminated and/or implemented in any other way. Further, the example measurement information receiver 205, the example configuration information storage 210, the example measurement processor 215, the example measurement scheduler 305, the example carrier frequency prioritizer 310, the example neighbor prioritizer 315, the example neighbor database 320, the example RSSI measurement processor 325, the example reselection-based prioritizer 330, the example measurement limitation signaler 335, the example carrier frequency selector 340, the example macro cell prioritizer 345, the example measurement limitation receiver 505, the example measurement information database 510, the example neighbor information signaler 515 and/or, more generally, the example mobile station 125 and/or the example network element 220 may be implemented by hardware, software, firmware and/or any combination of hardware, software and/or firmware. Thus, for example, any of the example measurement information receiver 205, the example configuration information storage 210, the example measurement processor 215, the example measurement scheduler 305, the example carrier frequency prioritizer 310, the example neighbor prioritizer 315, the example neighbor database 320, the example RSSI measurement processor 325, the example reselection-based prioritizer 330, the example measurement limitation signaler 335, the example carrier frequency selector 340, the example macro cell prioritizer 345, the example measurement limitation receiver 505, the example measurement information database 510, the example neighbor information signaler 515 and/or, more generally, the example mobile station 125 and/or the example network element 220 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example mobile station 125, the example network element 220, the example measurement information receiver 205, the example configuration information storage 210, the example measurement processor 215, the example measurement scheduler 305, the example carrier frequency prioritizer 310, the example neighbor prioritizer 315, the example neighbor database 320, the example RSSI measurement processor 325, the example reselection-based prioritizer 330, the example measurement limitation signaler 335, the example carrier frequency selector 340, the example macro cell prioritizer 345, the example measurement limitation receiver 505, the example measurement information database 510 and/or the example neighbor information signaler 515 are hereby expressly defined to include a tangible computer readable medium such as a memory, digital versatile disk (DVD), compact disk (CD), etc., storing such software and/or firmware. Further still, the example mobile station 125 and/or the example network element 220 may include one or more elements, processes and/or devices in addition to, or instead of, those illustrated in FIGS. 2-5, and/or may include more than one of any or all of the illustrated elements, processes and devices.

Flowcharts representative of example processes that may be executed to implement the example mobile station 125, the example network element 220, the example measurement information receiver 205, the example configuration information storage 210, the example measurement processor 215, the example measurement scheduler 305, the example carrier frequency prioritizer 310, the example neighbor prioritizer 315, the example neighbor database 320, the example RSSI measurement processor 325, the example reselection-based prioritizer 330, the example measurement limitation signaler 335, the example carrier frequency selector 340, the example macro cell prioritizer 345, the example measurement limitation receiver 505, the example measurement information database 510 and/or the example neighbor information signaler 515 are shown in FIGS. 6-14. In these examples, the process represented by each flowchart may be implemented by one or more programs comprising machine readable instructions for execution by a processor, such as the processor 1512 shown in the example processing system 1500 discussed below in connection with FIG. 15. Alternatively, the entire program or programs and/or portions thereof implementing one or more of the processes represented by the flowcharts of FIGS. 6-14 could be executed by a device other than the processor 1512 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 6-14, or one or more portion(s) thereof, may be implemented manually. Further, although the example processes are described with reference to the flowcharts illustrated in FIGS. 6-14, many other techniques for implementing the example methods and apparatus described herein may alternatively be used. For example, with reference to the flowcharts illustrated in FIGS. 6-14, the order of execution of the blocks may be changed, and/or some of the blocks described may be changed, eliminated, combined and/or subdivided into multiple blocks.

As mentioned above, the example processes of FIGS. 6-14 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-14 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

An example process 600 that may be executed to implement the example mobile station 125 described above is illustrated in FIG. 6. With reference to the preceding figures and associated descriptions, the process 600 of FIG. 6 begins execution at block 605 at which the measurement information receiver 205 of the mobile station 125 receives inter-frequency measurement configuration information from the mobile network 100. For example, at block 605 the measurement information receiver 205 can receive one or more neighbor cell lists specifying a set of one or more UTRAN (3G) carrier frequencies for which the network 100 expects measurements to be performed. At block 610, the measurement processor 215 of the mobile station 125 determines whether the set of frequencies specified in the inter-frequency measurement configuration information exceeds the monitoring capabilities of the mobile station 125. If the mobile station's monitoring capabilities are not exceeded, then at block 615 the measurement processor 215 causes the mobile station 125 to measure the entire set of specified frequencies. However, if the mobile station's monitoring capabilities are exceeded, then at block 620 the measurement processor 215 performs inter-frequency measurement prioritization using one or a combination of the example techniques disclosed herein. Example processes that may implement at least a portion of the processing at block 620 are illustrated in FIGS. 7-14, which are described in greater detail below.

Figure 6:
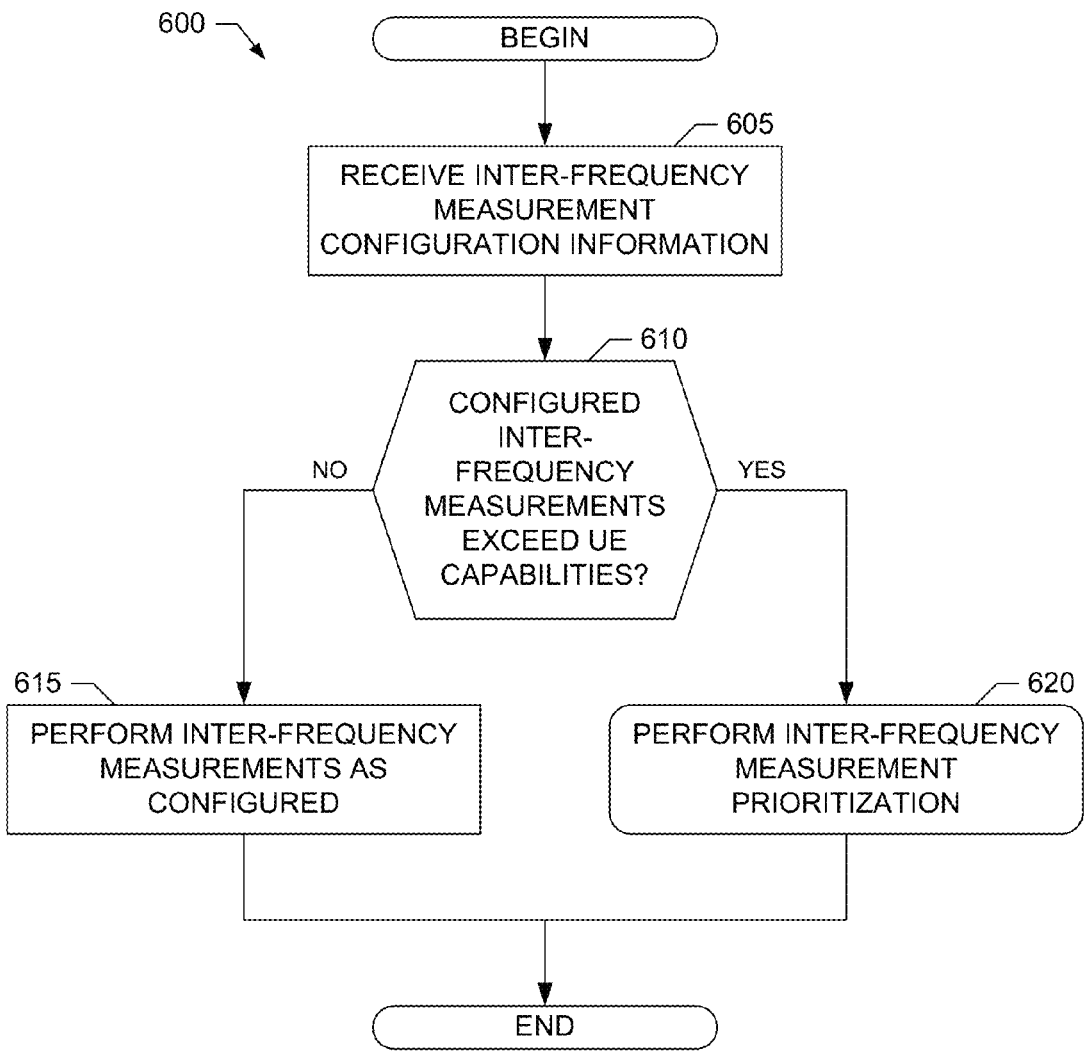
FIG. 6 is a flowchart representative of an example process that may be performed to implement the example mobile station of FIGS. 1, 2 and/or 3.
Figure 7:
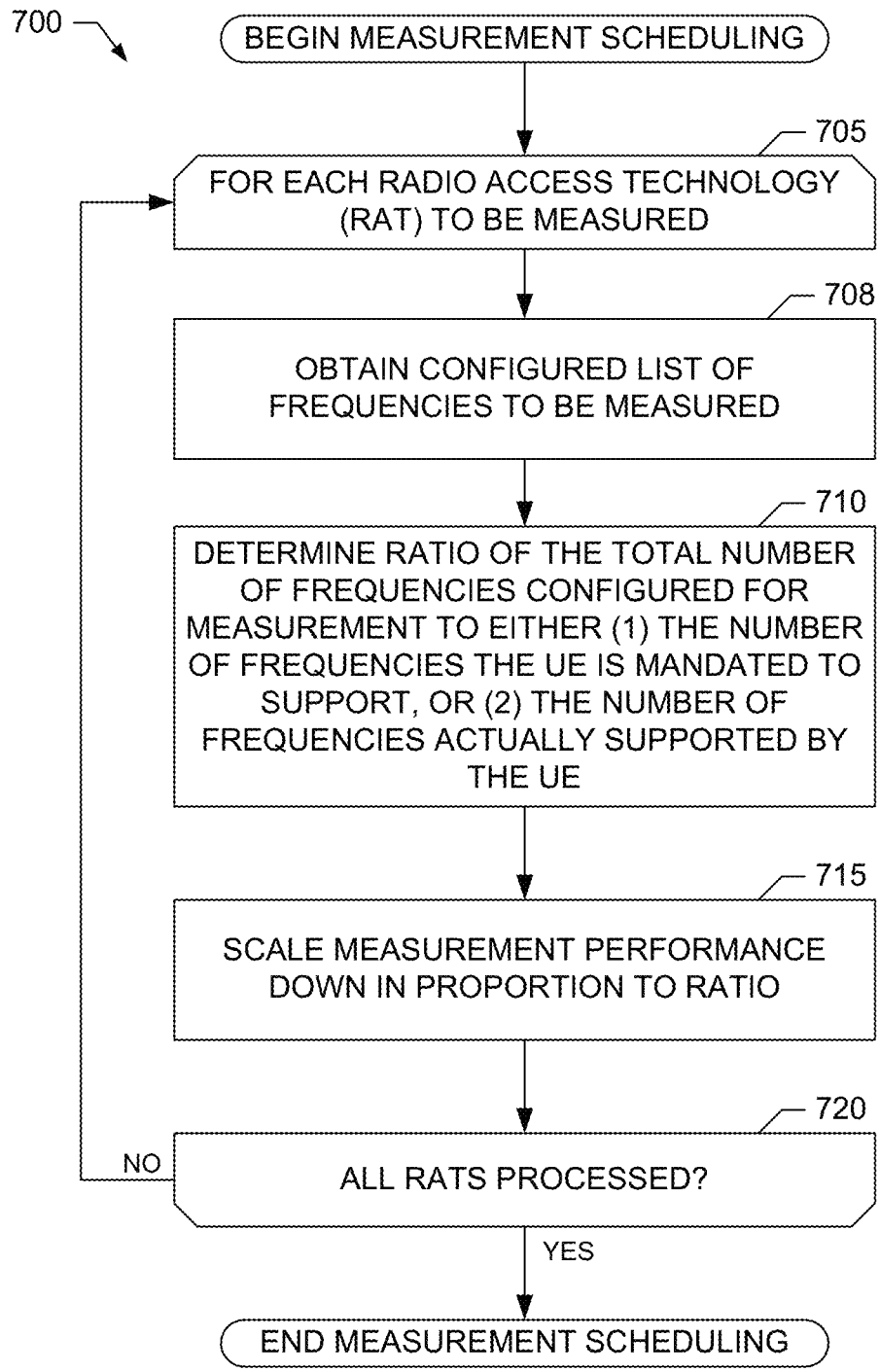
FIG. 7 is a flowchart representative of an example process for measurement scheduling that may be used to implement the example process of FIG. 6 and/or that may be executed to implement the example mobile station of FIGS. 1, 2 and/or 3.

An example process 700 that may be used to perform measurement scheduling at block 620 of FIG. 6 and/or to implement the example measurement scheduler 305 in the example mobile station 125 of FIG. 3 is illustrated in FIG. 7. With reference to the preceding figures and associated descriptions, the process 700 of FIG. 7 begins execution at block 705 at which the measurement scheduler 305 begins performing inter-frequency measurement scheduling for each RAT supported by the mobile station 125. For a particular RAT, at block 708 the measurement scheduler 305 obtains the list(s) (e.g., neighbor cell list(s)) signaled by the network 100 that specify the set of carrier frequencies configured by the network 100 for measurement. At block 710, the measurement scheduler 305 determines a ratio of the total number of frequencies specified in the set of frequencies contained in the measurement configuration information (e.g., neighbor cell list(s)) obtained from the network 100 to at least one of (1) the number of frequencies for which the mobile station 125 is mandated by the 3GPP specifications to support measurements, or (2) the number of frequencies actually supported by the monitoring capabilities of the mobile station 125.

At block 715, the measurement scheduler 305 schedules measurement to be performed by the mobile station 125 for all frequencies included in set of specified frequencies to be measured, but with measurement performance being scaled down in proportion to the ratio determined at block 710. For example, the measurement scheduler 305 can scale down measurement performance by reducing the measurement repetition rate (e.g., corresponding to how often each frequency is revisited) and/or measurement dwell (e.g., corresponding to how much measurement time is spent at each frequency). At block 720, the measurement scheduler 305 repeats measurement scheduling for each RAT supported by the mobile station 125.

Figure 8:
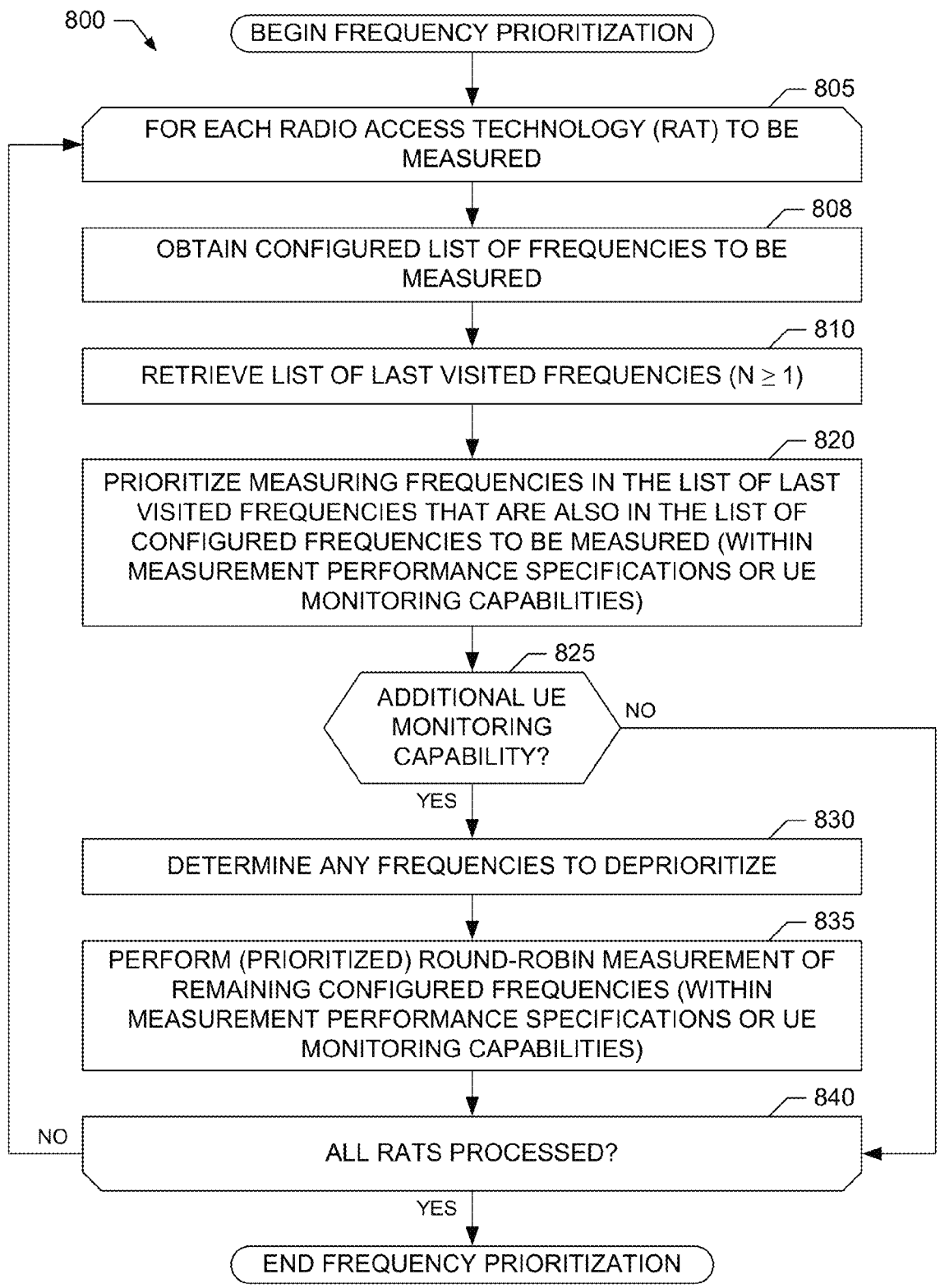
FIG. 8 is a flowchart representative of an example process for frequency prioritization that may be used to implement the example process of FIG. 6 and/or that may be executed to implement the example mobile station of FIGS. 1, 2 and/or 3.

An example process 800 that may be used to perform carrier frequency prioritization at block 620 of FIG. 6 and/or to implement the example carrier frequency prioritizer 310 in the example mobile station 125 of FIG. 3 is illustrated in FIG. 8. With reference to the preceding figures and associated descriptions, the process 800 of FIG. 8 begins execution at block 805 at which the carrier frequency prioritizer 310 begins performing carrier frequency prioritization for each RAT supported by the mobile station 125. For a particular RAT, at block 808 the carrier frequency prioritizer 310 obtains the list(s) (e.g., neighbor cell list(s)) signaled by the network 100 that specify the set of carrier frequencies configured by the network 100 for measurement. At block 810, the carrier frequency prioritizer 310 retrieves its list of the most recent N visited frequencies (N≥1). For example, the list retrieved by the carrier frequency prioritizer 310 at block 810 may be maintained and updated by a separate process, such as a background process, that keeps track of the frequencies most recently visited by the mobile station 125, as described above. For example, such a process could be implemented by the carrier frequency prioritizer 310 to: (1) clear the list or one or more particular frequencies in the list; (2) mark frequencies in the list to indicate whether or not the frequency is to be measured; (3) rank the frequencies in the list; etc., as described above.

At block 820, the carrier frequency prioritizer 310 prioritizes a subset of frequencies for which measurements are to be performed. For example, and as described above, the carrier frequency prioritizer 310 can prioritize the subset of frequencies to be those frequencies that are in both the list of most recently visited frequencies and the list of frequencies configured by the network 100 for measurement. At block 820, the carrier frequency prioritizer 310 also limits the size of the prioritized subset of frequencies to be within the monitoring capabilities of the mobile station 125.

At block 825, the carrier frequency prioritizer 310 determines whether the mobile station's monitoring capability has been exhausted. If the monitoring capability has not been exhausted, then at block 830 the carrier frequency prioritizer 310 can determine any remaining one or more frequencies in the set of frequencies specified the network 100 that can be de-prioritized, as described above, before determining which of the remaining frequencies are to be measured. At block 835, the carrier frequency prioritizer 310 performs round-robin measurement (or any other type of measurement scheduling) of the remaining frequencies in the set of frequencies specified the network 100 for measurement. At block 835, the carrier frequency prioritizer 310 can prioritize measurement of at least a subset of the remaining frequencies based on, for example, a respective number of cells associated with each remaining frequency, a respective RSSI determined for each remaining frequency, and/or any other prioritization technique described above. At block 840, the carrier frequency prioritizer 310 repeats carrier frequency prioritization for each RAT supported by the mobile station 125.

Figure 9:
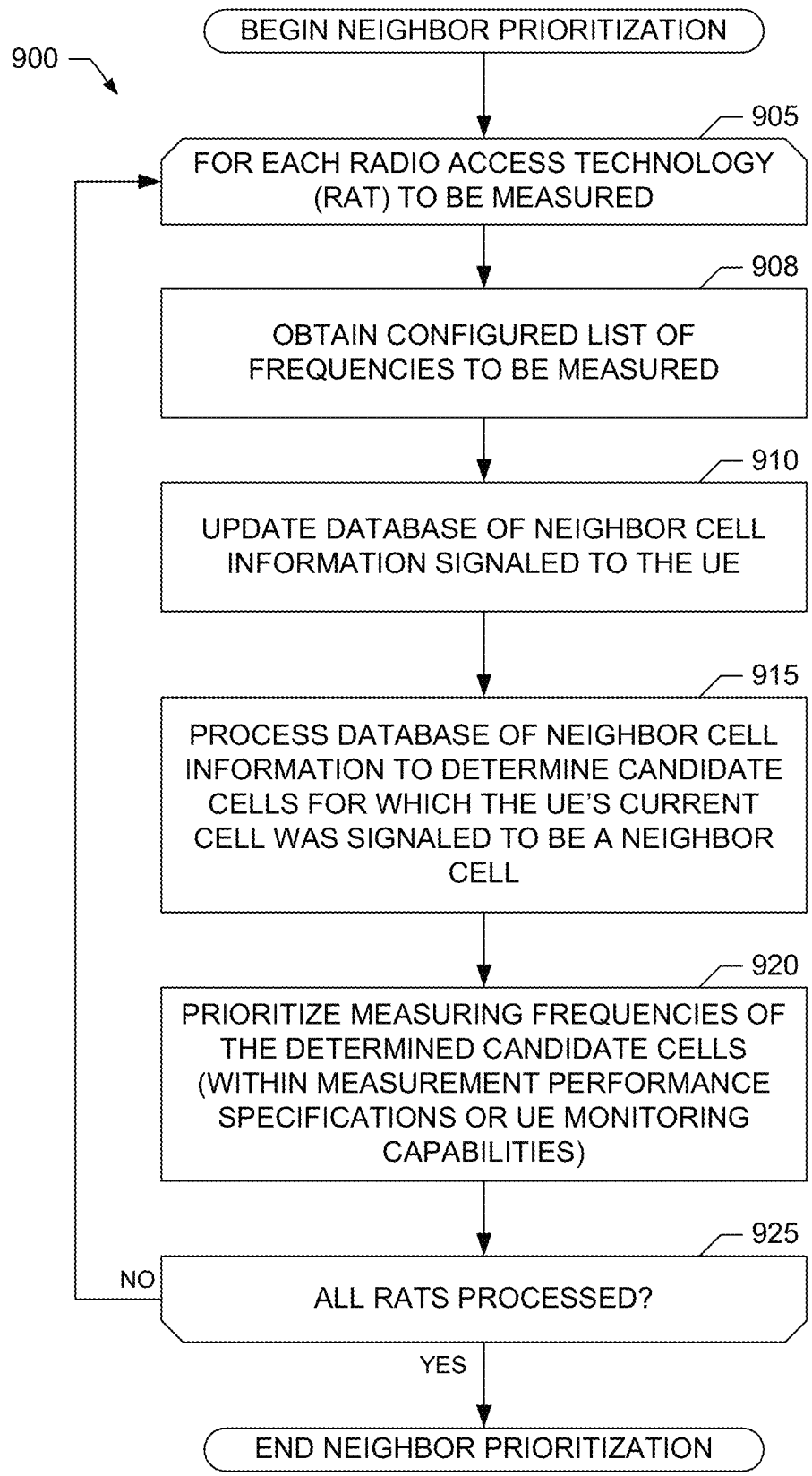
FIG. 9 is a flowchart representative of an example process for neighbor prioritization that may be used to implement the example process of FIG. 6 and/or that may be executed to implement the example mobile station of FIGS. 1, 2 and/or 3.

An example process 900 that may be used to perform neighbor prioritization at block 620 of FIG. 6 and/or to implement the example neighbor prioritizer 315 in the example mobile station 125 of FIG. 3 is illustrated in FIG. 9. With reference to the preceding figures and associated descriptions, the process 900 of FIG. 9 begins execution at block 905 at which the neighbor prioritizer 315 begins performing neighbor prioritization processing for each RAT supported by the mobile station 125. For a particular RAT, at block 908 the neighbor prioritizer 315 obtains the list(s) (e.g., neighbor cell list(s)) signaled by the network 100 that specify the set of carrier frequencies configured by the network 100 for measurement. At block 910, the neighbor prioritizer 315 updates the neighbor database 320 using neighbor cell information gathered from neighbor cell list(s) signaled by the network 100 to the mobile station 125. At block 915, the neighbor prioritizer 315 processes the neighbor cell information stored in the neighbor database 320 to determine a set of candidate cells for which the network 100 had previously signaled neighbor cell lists including the current serving cell of the mobile station 125.

At block 920, the neighbor prioritizer 315 prioritizes measurement of a subset of frequencies for which measurements are to be performed. For example, and as described above, the neighbor prioritizer 315 can prioritize the subset of frequencies to be those frequencies that are associated with the set of candidate cells determined at block 920 and in the list of frequencies configured by the network 100 for measurement. At block 920, the neighbor prioritizer 315 also limits the size of the prioritized subset of frequencies to be within the monitoring capabilities of the mobile station 125. At block 925, the carrier neighbor prioritizer 315 repeats neighbor prioritization for each RAT supported by the mobile station 125.

Figure 10:
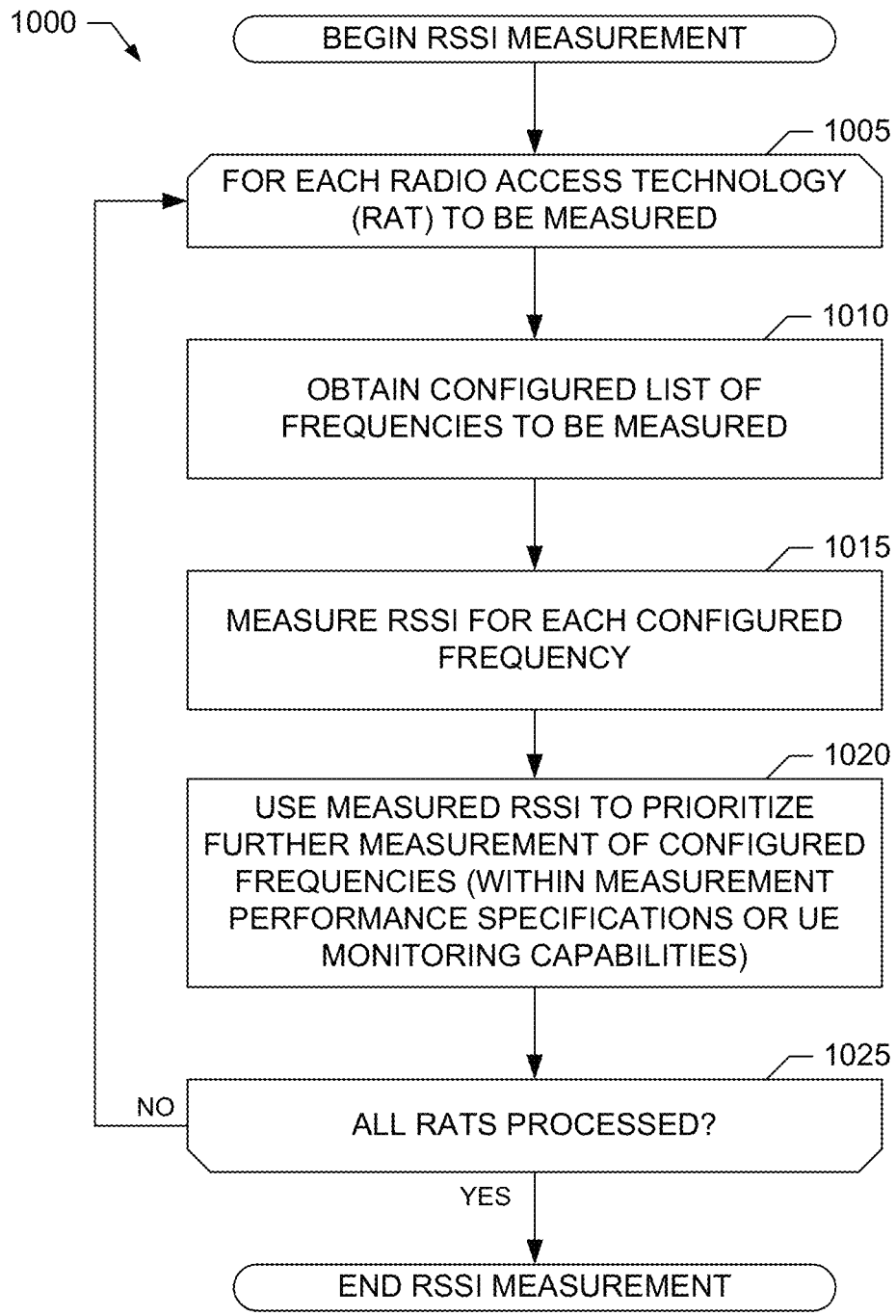
FIG. 10 is a flowchart representative of an example process for received signal strength indication measurement that may be used to implement the example process of FIG. 6 and/or that may be executed to implement the example mobile station of FIGS. 1, 2 and/or 3.

An example process 1000 that may be used to perform RSSI measurement processing at block 620 of FIG. 6 and/or to implement the example RSSI measurement processor 325 in the example mobile station 125 of FIG. 3 is illustrated in FIG. 10. With reference to the preceding figures and associated descriptions, the process 1000 of FIG. 10 begins execution at block 1005 at which the RSSI measurement processor 325 begins performing RSSI measurement prioritization processing for each RAT supported by the mobile station 125. For a particular RAT, at block 1010 obtains the list(s) (e.g., neighbor cell list(s)) signaled by the network 100 that specify the set of carrier frequencies configured by the network 100 for measurement. At block 1015, the RSSI measurement processor 325 causes the mobile station 125 to measure the RSSI for each frequency in the set of carrier frequencies specified by the network 100. At block 1020, the RSSI measurement processor 325 uses the measured RSSI for each frequency to prioritize a subset of frequencies for which measurements are to be performed. For example, the RSSI measurement processor 325 can prioritize the subset of frequencies to be those frequencies having the highest RSSI measurements. At block 1020, the RSSI measurement processor 325 also limits the size of the prioritized subset of frequencies to be within the monitoring capabilities of the mobile station 125. At block 1025, the carrier RSSI measurement processor 325 repeats RSSI measurement prioritization processing for each RAT supported by the mobile station 125. In some examples, the process 1000 may be repeated at regular intervals, for example, every 2 minutes, 5 minutes, 10 minutes, etc., to support mobile station mobility, such as scenarios in which the mobile station 125 moves to a location where coverage is available from different carrier frequencies.

Figure 11:
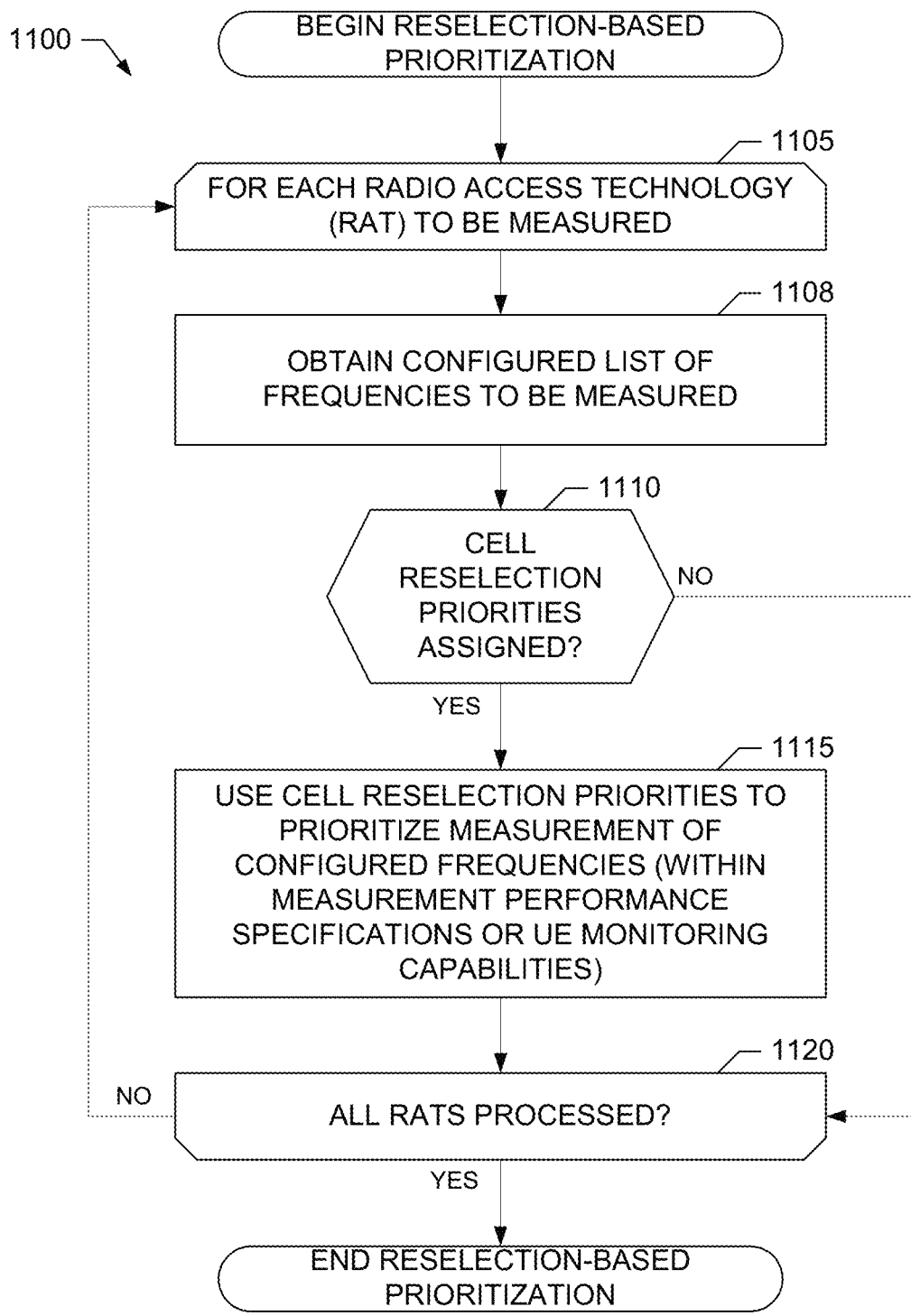
FIG. 11 is a flowchart representative of an example process for reselection prioritization that may be used to implement the example process of FIG. 6 and/or that may be executed to implement the example mobile station of FIGS. 1, 2 and/or 3.

An example process 1100 that may be used to perform reselection prioritization at block 620 of FIG. 6 and/or to implement the example reselection-based prioritizer 330 in the example mobile station 125 of FIG. 3 is illustrated in FIG. 11. With reference to the preceding figures and associated descriptions, the process 1100 of FIG. 11 begins execution at block 1105 at which the reselection-based prioritizer 330 begins performing reselection prioritization processing for each RAT supported by the mobile station 125. For a particular RAT, at block 1108 the reselection-based prioritizer 330 obtains the list(s) (e.g., neighbor cell list(s)) signaled by the network 100 that specify the set of carrier frequencies configured by the network 100 for measurement. At block 1110 the reselection-based prioritizer 330 determines whether the network 100 has assigned cell reselection priorities to neighbor cells included in the neighbor cell list(s) signaled to the mobile station 125. If cell reselection priorities have been assigned by the network 100, then at block 1115 the reselection-based prioritizer 330 uses the reselection priorities assigned to the neighbor cells and, thus, to the carrier frequencies of the neighbor cells, to prioritize a subset of frequencies for which measurements are to be performed. For example, the reselection-based prioritizer 330 can prioritize the subset of frequencies to be those frequencies associated with neighbor cells having the highest reselection priorities. At block 1115, the reselection-based prioritizer 330 also limits the size of the prioritized subset of frequencies to be within the monitoring capabilities of the mobile station 125. At block 1120, the reselection-based prioritizer 330 repeats reselection prioritization processing for each RAT supported by the mobile station 125.

Figure 12A:
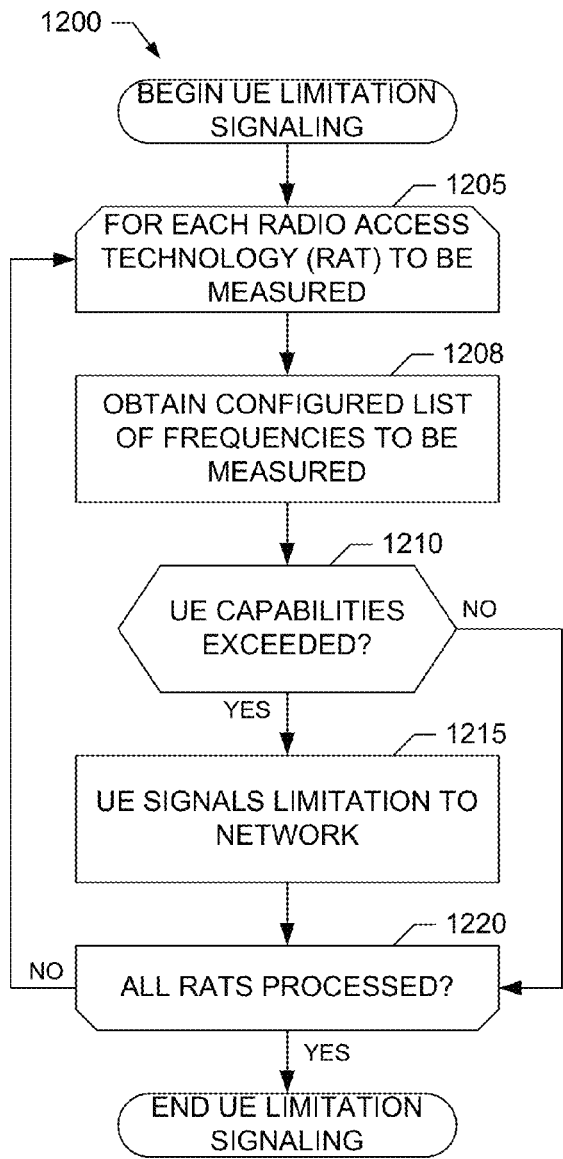
FIG. 12A is a flowchart representative of an example process for measurement limitation signaling that may be used to implement the example process of FIG. 6 and/or that may be executed to implement the example mobile station of FIGS. 1, 2 and/or 3.
Figure 12B:
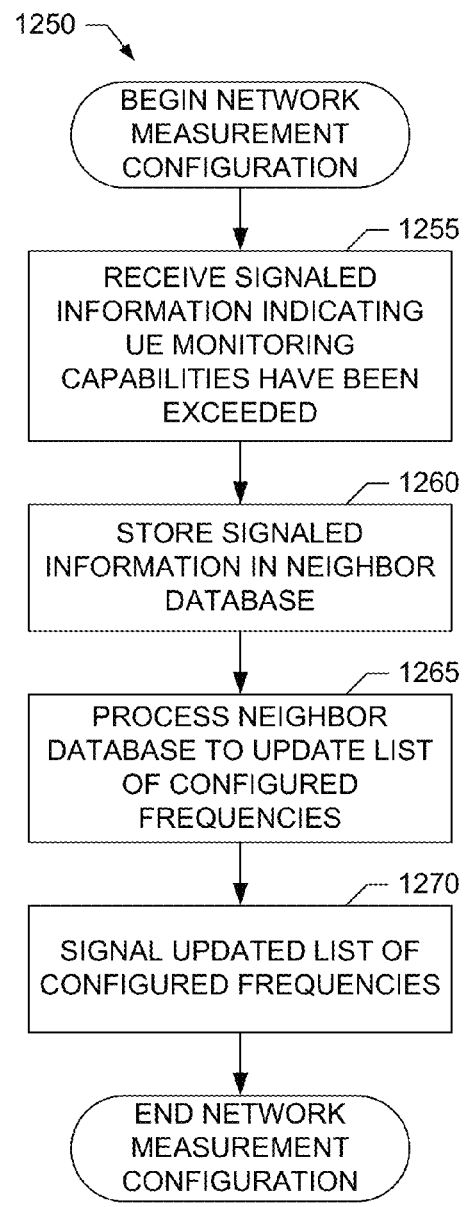
FIG. 12B is a flowchart representative of an example process for measurement configuration based on information received from the example process of FIG. 12A and that may be used to implement the example network element of FIGS. 2 and/or 5.

An example process 1200 that may be used to perform measurement limitation signaling at block 620 of FIG. 6 and/or to implement the example measurement limitation signaler 335 in the example mobile station 125 of FIG. 3 is illustrated in FIG. 12A. An example companion process 1250 that may be used to process measurement limitation information received by the network element 220 of FIGS. 2 and/or 5 is illustrated in FIG. 12B. With reference to the preceding figures and associated descriptions, the process 1200 of FIG. 12A begins execution at block 1205 at which the measurement limitation signaler 335 begins performing measurement limitation signaling for each RAT supported by the mobile station 125. For a particular RAT, at block 1208 the measurement limitation signaler 335 obtains the list(s) (e.g., neighbor cell list(s)) signaled by the network 100 that specify the set of carrier frequencies configured by the network 100 for measurement. At block 1210 the measurement limitation signaler 335 determines whether the monitoring capabilities of the mobile station 125 are exceeded by the set of frequencies specified by the network 100 for measurement (e.g., via the signaled neighbor cell list(s)). If the monitoring capabilities of the mobile station 125 are exceeded, then at block 1215 the measurement limitation signaler 335 signals to the network 100 that the monitoring capabilities of the mobile station 125 are exceeded by the set of frequencies currently specified for measurement by the neighbor cell list(s) signaled by the network 100. In some examples, the mobile station 125 can also signal a prioritized list of frequencies to the network 100, with the prioritized list of frequencies being determined using one or more of the inter-frequency measurement prioritization techniques disclosed herein. Additionally or alternatively, the measurement limitation signaler 335 could send location information to the network 100 indicating a location of the mobile station 125. At block 1220, the measurement limitation signaler 335 repeats measurement limitation signaling for each RAT supported by the mobile station 125.

With reference to the preceding figures and associated descriptions, the process 1250 of FIG. 12B begins execution at block 1255 at which the measurement limitation receiver 505 of the network element 220 receives the measurement limitation information from, for example, the mobile station 125 indicating that the monitoring capabilities of the mobile station 125 have been exceeded. At block 1260, the measurement limitation receiver 505 stores the measurement limitation information received from the mobile station 125 in the measurement information database 510 of the network element 220, including any prioritized list of frequencies suggested by the mobile station 125 to be configured for measurement, any location information provided by the mobile station 125 that can be associated with a particular prioritized list of frequencies, etc. At block 1265, the neighbor information signaler 515 of the network element 220 processes the measurement information database 510 to update the set of frequencies included in the neighbor cell list(s) signaled by the network element 220, as well as the order in which frequencies appear in the list(s), to effect the prioritization(s) suggested by the mobile station 125. At block 1270, the neighbor information signaler 515 causes the network element 220 to signal the updated neighbor cell list(s) in the appropriate cells of the network 100.

Figure 13:
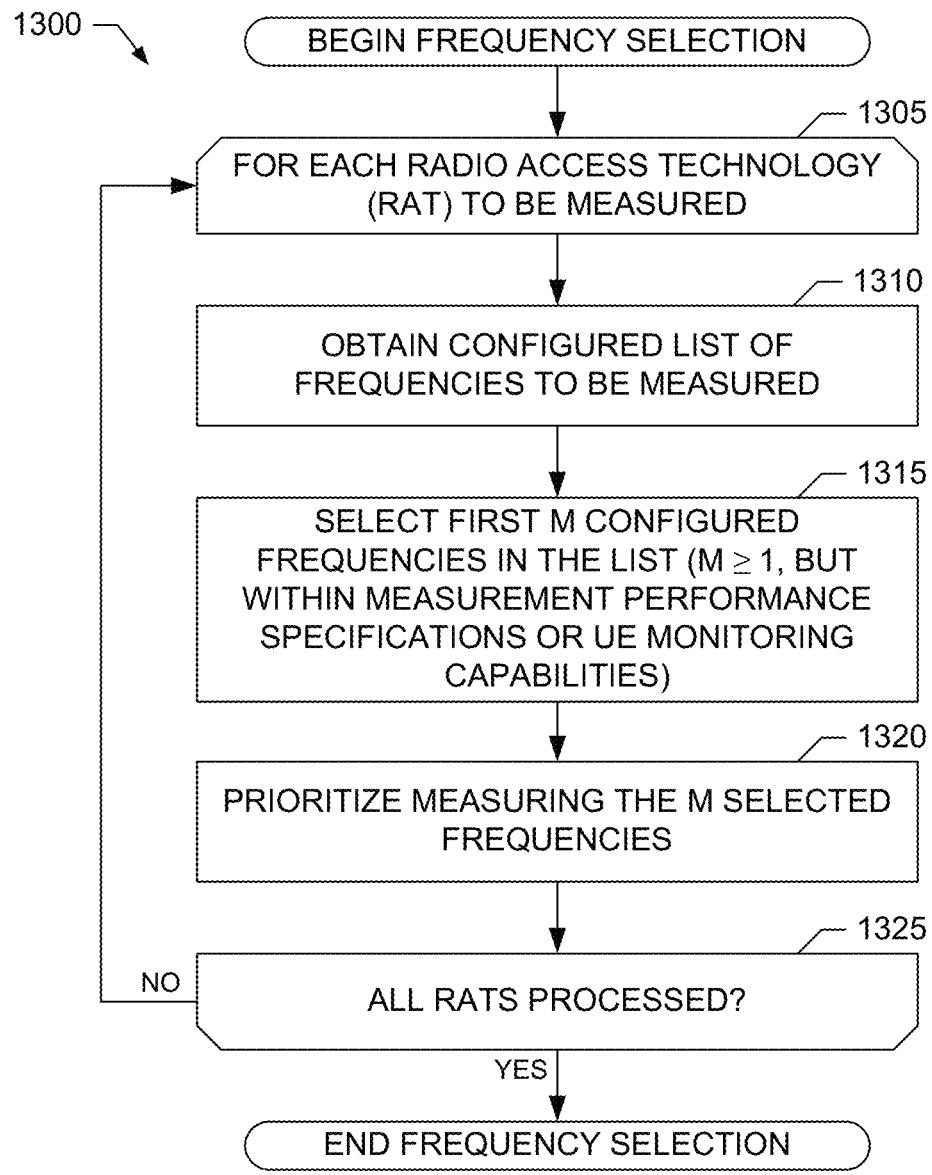
FIG. 13 is a flowchart representative of an example process for frequency selection that may be used to implement the example process of FIG. 6 and/or that may be executed to implement the example mobile station of FIGS. 1, 2 and/or 3.

An example process 1300 that may be used to perform carrier frequency selection at block 620 of FIG. 6 and/or to implement the example carrier frequency selector 340 in the example mobile station 125 of FIG. 3 is illustrated in FIG. 13. With reference to the preceding figures and associated descriptions, the process 1300 of FIG. 13 begins execution at block 1305 at which the carrier frequency selector 340 begins performing carrier frequency selection processing for each RAT supported by the mobile station 125. For a particular RAT, at block 1310 the carrier frequency selector 340 obtains the set of frequencies configured by the network 100 for measurement (e.g., via inclusion in one or more neighbor cell list(s) signaled to the mobile station 125). At block 1315, the carrier frequency selector 340 selects the first M frequencies listed in the set of frequencies configured by the network 100 ($M \geq 1$). At block 1320, the carrier frequency selector 340 prioritizes the subset of frequencies selected at block 1315 for measurement by the mobile station 125. At block 1320, the carrier frequency selector 340 also limits the size of the prioritized subset of frequencies to be within the monitoring capabilities of the mobile station 125. At block 1325, the carrier frequency selector 340 repeats carrier frequency selection for each RAT supported by the mobile station 125.

Figure 14:
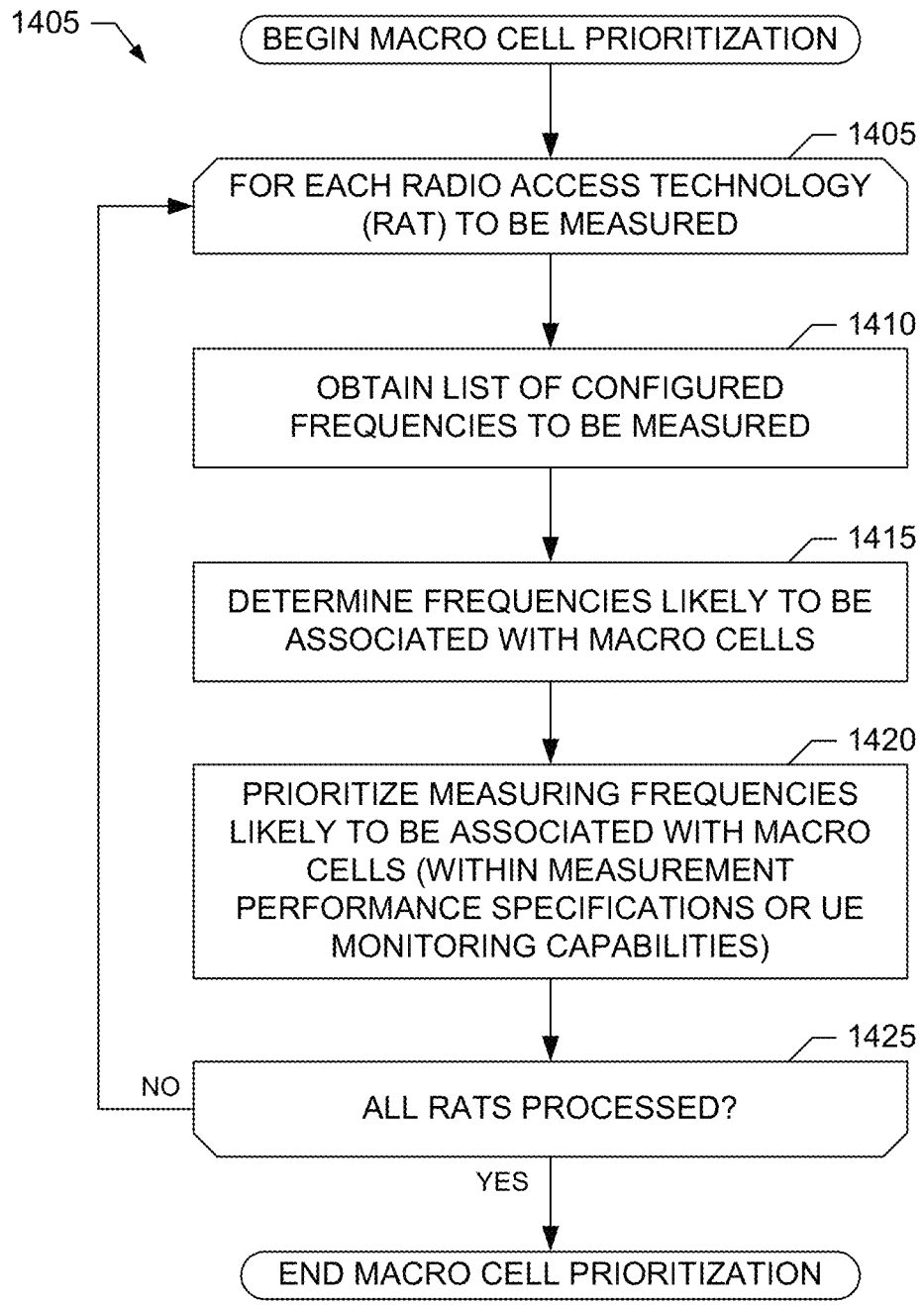
FIG. 14 is a flowchart representative of an example process for macro cell prioritization that may be used to implement the example process of FIG. 6 and/or that may be executed to implement the example mobile station of FIGS. 1, 2 and/or 3.

An example process 1400 that may be used to perform macro cell prioritization at block 620 of FIG. 6 and/or to implement the example macro cell prioritizer 345 in the example mobile station 125 of FIG. 3 is illustrated in FIG. 14. With reference to the preceding figures and associated descriptions, the process 1400 of FIG. 14 begins execution at block 1405 at which the macro cell prioritizer 345 begins performing macro cell prioritization for each RAT supported by the mobile station 125. For a particular RAT, at block 1410 the macro cell prioritizer 345 obtains the set of frequencies configured by the network 100 for measurement (e.g., via inclusion in one or more neighbor list(s) signaled to the mobile station 125). At block 1415, the macro cell prioritizer 345 determines, as described above, a subset of the configured frequencies that are likely to be associated macro cells in the mobile network 100. At block 1420, the macro cell prioritizer 345 prioritizes the subset of frequencies determined at block 1415 for measurement by the mobile station 125. At block 1420, the macro cell prioritizer 345 also limits the size of the prioritized subset of frequencies to be within the monitoring capabilities of the mobile station 125. At block 1425, the macro cell prioritizer 345 repeats macro cell prioritization for each RAT supported by the mobile station 125.

As another example, the carrier frequency prioritization features described, and corresponding FIGS. 3 and 8, may be entered into section 6.6.4 of the 3GPP TS 45.008 standard specification as follows:

6.6.4 Measurements on Cells of Other Radio Access Technologies

Insert the following text: "If the number of 3G (UTRAN FDD or UTRAN TDD) frequencies or cells in the 3G Cell Reselection list (see 3GPP TS 44.018) exceeds the MS monitoring capabilities as defined above, the UE shall prioritise measurements of those 3G frequencies from the list that have been most recently used by the UE (either camped on by the UE or used by the UE in CELL_DCH state)."

Additionally, the following optional text may be inserted: "For this purpose, the MS shall maintain a list of the [5] UARFCNs that have been recently used (either camped on by the UE or used by the UE in CELL_DCH state), excluding UARFCNs where the MS was only camped in limited service state. If the number of frequencies which are in the 3G Cell Reselection list, but which are not in the list of recently used frequencies, exceeds the MS monitoring capabilities, the MS shall monitor frequencies according to i) the number of cells in the 3G Cell Reselection list on the frequency, ii) the most recent RSSI measurement, then by iii) MS implementation."

The carrier frequency prioritization features described, and corresponding FIGS. 3 and 8, may be entered into section 8.6.7.14 of the 3GPP TS 25.331 standard specification as follows:

8.6.7.14 Inter-Frequency Measurement

If the Inter-frequency cell info list, included in the variable CELL_INFO_LIST, includes a number (M) of frequencies that is larger than the number (N) considered in a UE performance requirement defined in [19] and [20]:
1> the UE shall:
 2> prioritise the N frequencies most recently used by the UE (either camped on by the UE or used in CELL_DCH state) and meet the performance requirements on the (N) prioritised frequencies.
1> the UE may:
 2> ignore the remaining (M-N) frequencies.

As another example, the RSSI measurement-based prioritization features described, and corresponding FIGS. 3 and 10, may be entered into section 6.6.4 of the 3GPP TS 45.008 standard specification as follows:

6.6.4 Measurements on Cells of Other Radio Access Technologies

Insert the following text: "If the number of 3G (UTRAN FDD or UTRAN TDD) frequencies or cells in the 3G Cell Reselection list (see 3GPP TS 44.018) exceeds the MS monitoring capabilities as defined above, the MS shall perform UTRA Carrier RSSI measurements on all the listed 3G (UTRAN FDD or UTRAN TDD, respectively) frequencies repeating these measurements at least every TBDs [e.g. 60, 120 s]. The UE shall perform RSCP and Ec/Io measurements on the 3 3G (UTRAN FDD or UTRAN TDD, respectively) UTRAN frequencies with the highest UTRA Carrier RSSI measurement."

Figure 15:
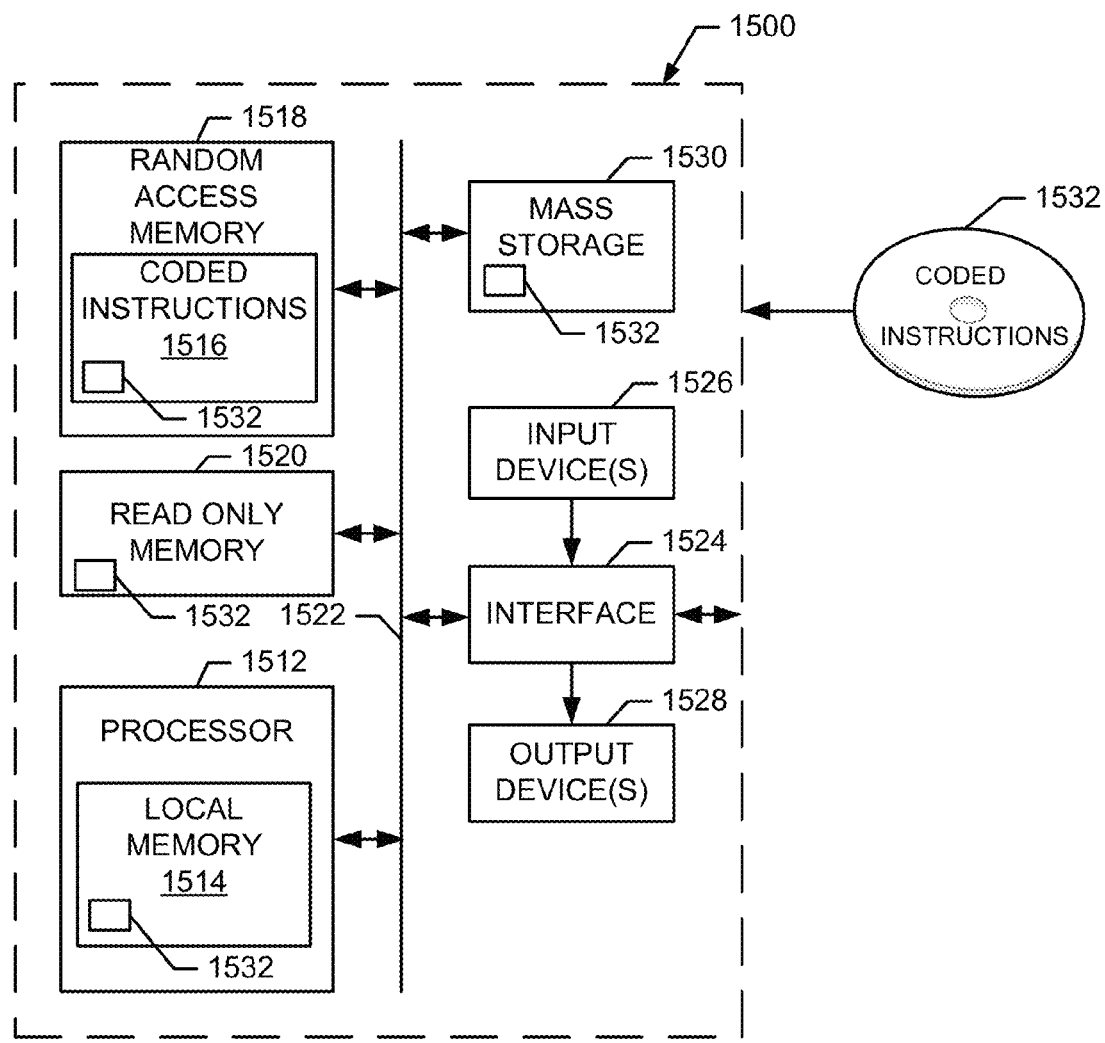
FIG. 15 is a block diagram of an example processing system that may execute example machine readable instructions used to implement one or more of the processes of FIGS. 6-13 and/or 14 to implement the example mobile network of FIG. 1, the example mobile station of FIGS. 1, 2 and/or 3, and/or the example network element of FIGS. 2 and/or 5.

The RSSI measurement-based prioritization features described, and corresponding FIGS. 3 and 10, may be entered into section 8.6.7.14 of the 3GPP TS 25.331 standard specification as follows 8.6.7.14 Inter-Frequency Measurement If the Inter-frequency cell info list, included in the variable CELL_INFO_LIST, includes a number (M) of frequencies that is larger than the number (N) considered in a UE performance requirement defined in [19] and [20]:
1> the UE shall:
 2> perform UTRA Carrier RSSI measurements on the (M) frequencies included in the variable CELL_INFO-LIST, repeating these measurements at least every N s [e.g. where N=60, 120 s];
 2> perform measurements and meet this performance requirement on the (N) frequencies with the highest UTRA Carrier RSSI measurement.
1> the UE may:
 2> ignore the remaining (M-N) frequencies FIG. 15 is a block diagram of an example processing system 1500 capable of implementing the apparatus and methods disclosed herein. The processing system 1500 can be, for example, a smartphone, a mobile phone, a personal digital assistant (PDA), a server, a personal computer, a network processing element, or any other type of computing device.

The system 1500 of the instant example includes a processor 1512 such as a general purpose programmable processor. The processor 1512 includes a local memory 1514, and executes coded instructions 1516 present in the local memory 1514 and/or in another memory device. The processor 1512 may execute, among other things, machine readable instructions to implement the processes represented in FIGS. 6-14. The processor 1512 may be any type of processing unit, such as one or more Intel® microprocessors from the Pentium® family, the Itanium® family and/or the XScale® family, one or more microcontrollers from the ARM® and/or PICO® families of microcontrollers, etc. Of course, other processors from other families are also appropriate.

The processor 1512 is in communication with a main memory including a volatile memory 1518 and a non-volatile memory 1520 via a bus 1522. The volatile memory 1518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1520 may be implemented by flash memory and/or any other desired type of memory device. Access to the main memory 1518, 1520 is typically controlled by a memory controller (not shown).

The processing system 1500 also includes an interface circuit 1524. The interface circuit 1524 may be implemented by any type of interface standard, such as an Ethernet interface, a universal serial bus (USB), and/or a third generation input/output (3GIO) interface.

One or more input devices 1526 are connected to the interface circuit 1524. The input device(s) 1526 permit a user to enter data and commands into the processor 1512. The input device(s) can be implemented by, for example, a keyboard, a mouse, a touchscreen, a track-pad, a trackball, an isopoint and/or a voice recognition system.

One or more output devices 1528 are also connected to the interface circuit 1524. The output devices 1528 can be implemented, for example, by display devices (e.g., a liquid crystal display, a cathode ray tube display (CRT)), by a printer and/or by speakers. The interface circuit 1524, thus, typically includes a graphics driver card.

The interface circuit 1524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1500 also includes one or more mass storage devices 1530 for storing machine readable instructions and data. Examples of such mass storage devices 1530 include floppy disk drives, hard drive disks, compact disk drives and digital versatile disk (DVD) drives. In some examples, the mass storage device 1530 may implement the configuration information storage 210, the neighbor database 320 and/or the measurement information database 510. Additionally or alternatively, in some examples the volatile memory 1518 may implement the configuration information storage 210, the neighbor database 320 and/or the measurement information database 510.

The coded instructions 1532 of FIGS. 6-14 may be stored in the mass storage device 1530, in the volatile memory 1518, in the non-volatile memory 1520, in the local memory 1514 and/or on a removable storage medium, such as a CD or DVD 1532.

As an alternative to implementing the methods and/or apparatus described herein in a system such as the processing system of FIG. 15, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method in a mobile station, the method comprising:
receiving, from a network, one or more lists specifying a set of frequencies for which measurements are to be performed; and
varying a rate at which the measurements are to be performed for a first frequency of the set of frequencies based on a number of frequencies for which the measurements are to be performed.

2. A method as defined in claim 1, wherein varying the rate comprises scaling the rate at which the measurements are to be performed for the first frequency in proportion to the number of frequencies for which the measurements are to be performed.

3. A method as defined in claim 1, further comprising prioritizing performance of the measurements for at least a first subset of the frequencies based on at least one criterion.

4. A method as defined in claim 3, wherein the at least one criterion comprises prioritizing the performance of the measurements based on an order of the respective ones of the set of frequencies in the one or more lists.

5. A method as defined in claim 4, further comprising prioritizing the first frequency over a second frequency of the set of frequencies if information specifying the first frequency in the one or more lists appears before information specifying the second frequency in the one or more lists.

6. A method as defined in claim 3, further comprising performing the measurements for a second subset of the frequencies according to a round-robin measurement process.

7. A method as defined in claim 3, wherein the one or more lists are one or more first lists, and further comprising maintaining a second list of frequencies indicating which ones of the set of frequencies have been prioritized for measurement.

8. A tangible computer readable medium comprising computer readable instructions which, when executed, cause a mobile station to at least:
access one or more lists received from a network, the one or more lists specifying a set of frequencies for which measurements are to be performed; and
vary a rate at which the measurements are to be performed for a first frequency of the set of frequencies based on a number of frequencies for which the measurements are to be performed.

9. A tangible computer readable medium as defined in claim 8, wherein to vary the rate, the instructions, when executed, cause the mobile station to scale the rate at which the measurements are to be performed for the first frequency in proportion to the number of frequencies for which the measurements are to be performed.

10. A tangible computer readable medium as defined in claim 8, wherein the instructions, when executed, further cause the mobile station to prioritize performance of the measurements for at least a first subset of the frequencies based on at least one criterion.

11. A tangible computer readable medium as defined in claim 10, wherein the at least one criterion comprises prioritizing the performance of the measurements based on an order of the respective ones of the set of frequencies in the one or more lists.

12. A tangible computer readable medium as defined in claim 11, wherein the instructions, when executed, further cause the mobile station to prioritize the first frequency over a second frequency of the set of frequencies if information specifying the first frequency in the one or more lists appears before information specifying the second frequency in the one or more lists.

13. A tangible computer readable medium as defined in claim 10, wherein the instructions, when executed, further cause the mobile station to perform the measurements for a second subset of the frequencies according to a round-robin measurement process.

14. A tangible computer readable medium as defined in claim 10, wherein the one or more lists are one or more first lists, and the instructions, when executed, further cause the mobile station to maintain a second list of frequencies indicating which ones of the set of frequencies have been prioritized for measurement.

15. A mobile station comprising:
a memory to store one or more lists received from a network, the one or more lists specifying a set of frequencies for which measurements are to be performed; and
a processor to vary a rate at which the measurements are to be performed for a first frequency of the set of frequencies based on a number of frequencies for which the measurements are to be performed.

16. A mobile station as defined in claim 15, wherein to vary the rate, the processor is to scale the rate at which the measurements are to be performed for the first frequency in proportion to the number of frequencies for which the measurements are to be performed.

17. A mobile station as defined in claim 15, wherein the processor is further to prioritize performance of the measurements for at least a first subset of the frequencies based on at least one criterion.

18. A mobile station as defined in claim 17, wherein the at least one criterion comprises prioritizing the performance of the measurements based on an order of the respective ones of the set of frequencies in the one or more lists.

19. A mobile station as defined in claim 18, wherein the processor is further to prioritize the first frequency over a second frequency of the set of frequencies if information specifying the first frequency in the one or more lists appears before information specifying the second frequency in the one or more lists.

20. A mobile station as defined in claim 17, wherein the processor is further to perform the measurements for a second subset of the frequencies according to a round-robin measurement process.

21. A mobile station as defined in claim 17, wherein the one or more lists are one or more first lists, and the processor is further to maintain a second list of frequencies indicating which ones of the set of frequencies have been prioritized for measurement.

* * * * *